US012645843B2

(12) United States Patent
Han et al.

(10) Patent No.: US 12,645,843 B2
(45) Date of Patent: Jun. 2, 2026

(54) DATA PROTECTION METHOD AND SYSTEM, MEDIUM, AND ELECTRONIC DEVICE

(71) Applicant: HUAWEI TECHNOLOGIES CO., LTD., Shenzhen (CN)

(72) Inventors: Huayuan Han, Shenzhen (CN); Bing Ma, Shenzhen (CN); Jie Li, Shenzhen (CN); Kui Wang, Beijing (CN); Xuan Zhou, Shenzhen (CN); Lei Chen, Beijing (CN); Qiang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 18/264,248

(22) PCT Filed: Dec. 31, 2021

(86) PCT No.: PCT/CN2021/143962
§ 371 (c)(1),
(2) Date: Aug. 3, 2023

(87) PCT Pub. No.: WO2022/166502
PCT Pub. Date: Aug. 11, 2022

(65) Prior Publication Data
US 2024/0095408 A1 Mar. 21, 2024

(30) Foreign Application Priority Data
Feb. 4, 2021 (CN) .......................... 202110158831.1

(51) Int. Cl.
*G06F 21/74* (2013.01)
*G06F 21/60* (2013.01)

(52) U.S. Cl.
CPC ............ *G06F 21/74* (2013.01); *G06F 21/602* (2013.01); *G06F 21/604* (2013.01)

(58) Field of Classification Search
CPC ...... G06F 21/57; G06F 21/602; G06F 21/604; G06F 21/6218; G06F 21/6245;
(Continued)

(56) References Cited

U.S. PATENT DOCUMENTS

2015/0341341 A1* 11/2015 Messerges ................ H04L 9/32
713/151
2020/0250326 A1 8/2020 Jo et al.

FOREIGN PATENT DOCUMENTS

CN 104298903 A 1/2015
CN 107196977 A 9/2017
(Continued)

*Primary Examiner* — Kevin Bechtel

(57) ABSTRACT

Embodiments of this application disclose a data protection method and system, a medium, and an electronic device, and belong to the field of communication technologies. In embodiments of this application, a first electronic device establishes a communication connection to a second electronic device. The first electronic device is a trusted device of the second electronic device. When detecting a first trigger condition, the first electronic device sends first data to the second electronic device. The first data is used to trigger the second electronic device to enter a maintenance mode. According to embodiments of this application, the first electronic device triggers the second electronic device to enter the maintenance mode, to protect data of the electronic devices.

20 Claims, 21 Drawing Sheets

(58) Field of Classification Search
   CPC .. G06F 21/74; G06F 21/78; G06F 2221/2105;
                G06F 2221/2149; H04L 63/0876; H04L
                63/10; H04L 63/105; H04L 63/20–205;
                                              H04L 67/12–125
   See application file for complete search history.

(56)                References Cited

FOREIGN PATENT DOCUMENTS

| | | |
|---|---|---|
| CN | 111949956 A | 11/2020 |
| CN | 112966297 A | 6/2021 |

* cited by examiner

Mobile phone

Mobile phone

A television device performs networking after being started — S91

The television device detects that a mobile phone in the networking is in a maintenance mode — S92

S93 — The television device determines whether to continue the networking

No → End

Yes

Receive first data, and enter a maintenance mode — S94

Receive second data — S95

Exit the maintenance mode — S96

Receive a first input command entered by a user — S141

Determine, based on the first input command, whether the current user is an owner — S142

No → End

Yes

Obtain primary control permission — S143

Receive a second input command entered by the user — S144

Send corresponding permission setting information to a second electronic device according to the second input instruction — S145

Mobile phone

Mobile phone

Mobile phone

DATA PROTECTION METHOD AND SYSTEM, MEDIUM, AND ELECTRONIC DEVICE

CROSS-REFERENCE TO RELATED APPLICATIONS

This application is a National Stage of International Application No. PCT/CN2021/143962 filed on Dec. 31, 2021, which claims priority to Chinese Patent Application No. 202110158831.1 filed on Feb. 4, 2021. Both of the aforementioned applications are hereby incorporated by reference in their entireties.

TECHNICAL FIELD

This application relates to the field of device management technologies, and in particular, to a data protection method and system, a medium, and an electronic device.

BACKGROUND

Use of an electronic device plays an increasingly important role in daily life. For example, a mobile phone device may carry a large amount of personal data of a user, for example, an instant messaging record, a photo, an address book, a video, a voice record, a schedule record, and a trip record. In a scenario such as maintenance of an electronic device or lending of an electronic device, it is easy to view, export, or transfer data in the electronic device.

SUMMARY

Embodiments of this application provide a data protection method, to protect data of an electronic device.

According to a first aspect, an embodiment of this application provides a data protection method, applied to a first electronic device. The method includes: The first electronic device establishes a communication connection to a second electronic device. The first electronic device is a trusted device of the second electronic device. When detecting a first trigger condition, the first electronic device sends first data to the second electronic device. The first data is used to trigger the second electronic device to enter a maintenance mode. When the electronic device enters the maintenance mode, data of the electronic device may be protected, to prevent the data of the electronic device from being viewed, exported, or transferred.

In this embodiment of this application, when detecting the first trigger condition, the first electronic device sends the first data to the second electronic device, to trigger the second electronic device to enter the maintenance mode. In this way, the first electronic device triggers the second electronic device to enter the maintenance mode, so that data of the first electronic device and the second electronic device is protected, to prevent the data of the first electronic device and the second electronic device from being viewed, exported, or transferred.

Optionally, the first trigger condition includes: the first electronic device is in a maintenance inspection state, or the first electronic device is in a maintenance mode, or the first electronic device enters a maintenance mode. That the first electronic device is in a maintenance inspection state, or the first electronic device is in the maintenance mode, or the first electronic device enters the maintenance mode means that the first electronic device is in an insecure environment and it is easy to view, export, or transfer the data of the first electronic device and the second electronic device. In this case, when the first electronic device that is networked and connected to the second electronic device is in the insecure environment, the data of the first electronic device and the second electronic device needs to be protected. The first electronic device triggers the second electronic device to enter the maintenance mode, to protect the data of the second electronic device and avoid a case in which the second electronic device is in an insecure environment.

Optionally, the first trigger condition further includes: the first electronic device requests the second electronic device to provide inspection permission. The first electronic device requests the second electronic device to provide the inspection permission. In other words, when the second electronic device is in the insecure environment, it is easy to view, export, or transfer the data of the second electronic device during inspection of the second electronic device. Therefore, the first electronic device needs to trigger the second electronic device to enter the maintenance mode, to protect the data of the second electronic device and avoid the case in which the second electronic device is in the insecure environment.

Optionally, the first trigger condition includes: the first electronic device receives an instruction that is entered by a user and that instructs the second electronic device to enter the maintenance mode. The user may trigger, through the first electronic device based on a personal requirement, the second electronic device to enter the maintenance mode. Therefore, the data of the electronic devices is protected based on the requirement of the user.

Optionally, that the first electronic device enters a maintenance mode includes: encrypting privacy data.

Optionally, that the first electronic device enters a maintenance mode includes: providing the inspection permission, to implement maintenance inspection on the first electronic device.

Optionally, that the first electronic device enters a maintenance mode includes: providing maintenance inspection space; and opening access permission of the maintenance inspection space to a trusted device of the first electronic device.

According to a second aspect, an embodiment of this application provides a data protection method, applied to a second electronic device. The method includes: The second electronic device establishes a communication connection to a first electronic device. The second electronic device is a trusted device of the first electronic device. The second electronic device receives first data sent by the first electronic device. The second electronic device enters a maintenance mode based on the first data. The second electronic device enters the maintenance mode based on the first data sent by the first electronic device, to protect data of the second electronic device.

Optionally, the first data includes one of the following information: that the first electronic device is in a maintenance inspection state, that the first electronic device is in a maintenance mode, and that the first electronic device enters a maintenance mode.

Optionally, the first data further includes information used to request the second electronic device to provide inspection permission.

Optionally, the first data includes information that is entered by a user and that instructs the second electronic device to enter the maintenance mode.

Optionally, the entering a maintenance mode based on the first data includes: encrypting privacy data.

Optionally, the entering a maintenance mode based on the first data further includes: providing the inspection permission, to implement maintenance inspection on the second electronic device.

Optionally, the entering a maintenance mode based on the first data further includes: providing maintenance inspection space; and opening access permission of the maintenance inspection space to a trusted device of the second electronic device.

According to a third aspect, an embodiment of this application provides a data protection system, including at least a first electronic device and a second electronic device. The first electronic device establishes a communication connection to the second electronic device. The second electronic device is a trusted device of the first electronic device. Under a first trigger condition, the first electronic device sends first data to the second electronic device. The second electronic device receives the first data. The second electronic device enters a maintenance mode based on the first data.

According to a fourth aspect, an embodiment of this application provides a data protection system, including a cloud server and at least one electronic device. The cloud server establishes a communication connection to the at least one electronic device. The cloud server is a trusted device of the at least one electronic device. When detecting a first trigger condition, the electronic device sends first data to the cloud server. The cloud server receives the first data. The cloud server enters a maintenance mode based on the first data.

According to a fifth aspect, a computer-readable storage medium is provided. The computer-readable storage medium stores computer program code. When the computer program code is executed by a computing device, the computing device performs the foregoing method.

According to the fifth aspect, an electronic device is provided. The electronic device includes a processor and a memory. The memory is configured to store a group of computer instructions. When the processor executes the group of computer instructions, the computing device performs the foregoing method.

Technical effects achieved in the second aspect, the third aspect, the fourth aspect, and the fifth aspect are similar to those achieved by corresponding technical means in the first aspect. Details are not described again herein.

Beneficial effects brought by the technical solutions provided in this application include at least the following:

In embodiments of this application, the first electronic device triggers the second electronic device to enter the maintenance mode, to protect the data of the first electronic device and the second electronic device. In this way, the following case is avoided: When the first electronic device or the second electronic device is in the insecure environment, the data of the first electronic device and the second electronic device is viewed, exported, or transferred. Therefore, the data of the first electronic device and the second electronic device is protected.

DESCRIPTION OF EMBODIMENTS

It should be noted that, in this application, "at least one" means one or more, and "a plurality of" means two or more. In addition, "and/or" describes an association relationship between associated objects, and represents that three relationships may exist. For example, A and/or B may represent the following cases: Only A exists, both A and B exist, and only B exists, where A and B may be singular or plural. In the specification, claims, and accompanying drawings of this application, the terms "first", "second", "third", "fourth", and so on (if existent) are intended to distinguish between similar objects but do not indicate a specific order or sequence.

It will be understood that when an element (for example, a first element) is referred to as being "(operably or communicatively) coupled to another element (for example, a second element)" or "connected to" another element, the element may be directly coupled to or connected to the another element or an intervening element (for example, a third element) may exist. Conversely, when an element (for example, a first element) is referred to as being "directly coupled" or "directly connected to" another element (for example, a second element), it should be understood that no intervening element (for example, a third element) exists.

Figure 1:
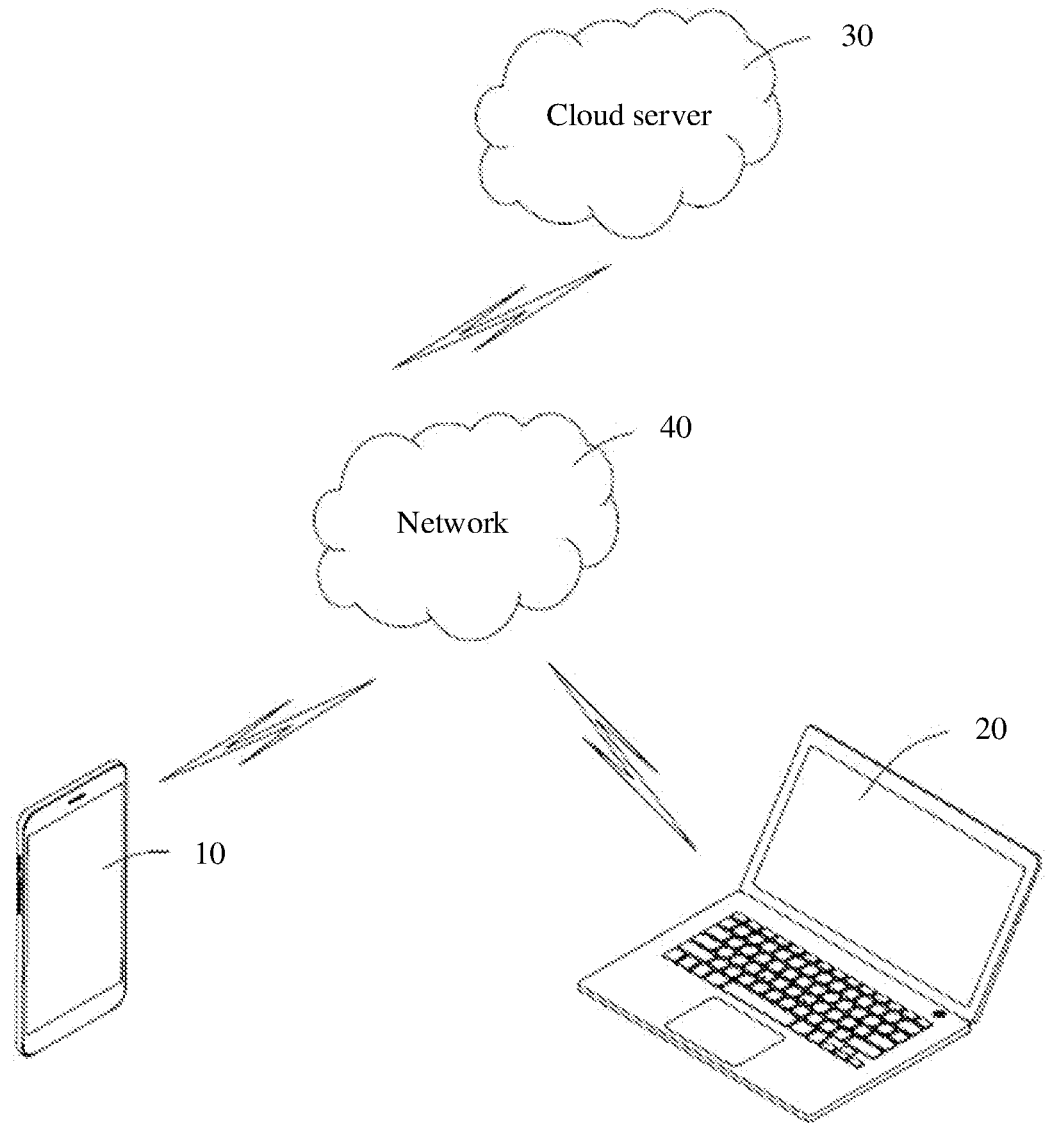
FIG. 1 is a simplified schematic diagram of a system architecture according to an embodiment of this application.

FIG. 1 is a simplified schematic diagram of a system architecture according to an embodiment of this application. As shown in FIG. 1, the system architecture may include a first electronic device 10, a second electronic device 20, and a cloud server 30. The first electronic device 10, the second electronic device 20, and the cloud server 30 access a same network 40. The network 40 may include a wide area network, a metropolitan area network, and a local area network. That the first electronic device 10 and the second electronic device 20 access a same local area network may be specifically that the first electronic device 10 and the second electronic device 20 establish wireless connection to a same wireless access point. For example, the first electronic device 10 and the second electronic device 20 access a same wireless fidelity (Wi-Fi) hotspot. For another example, the first electronic device 10 and the second electronic device 20 may also access a same Bluetooth beacon according to a Bluetooth protocol. The first electronic device 10 establishes wired connection to the second electronic device 20. For example, the first electronic device 10 is connected to the second electronic device 20 through a wired connection medium such as an optical fiber or a copper wire.

Figure 2:
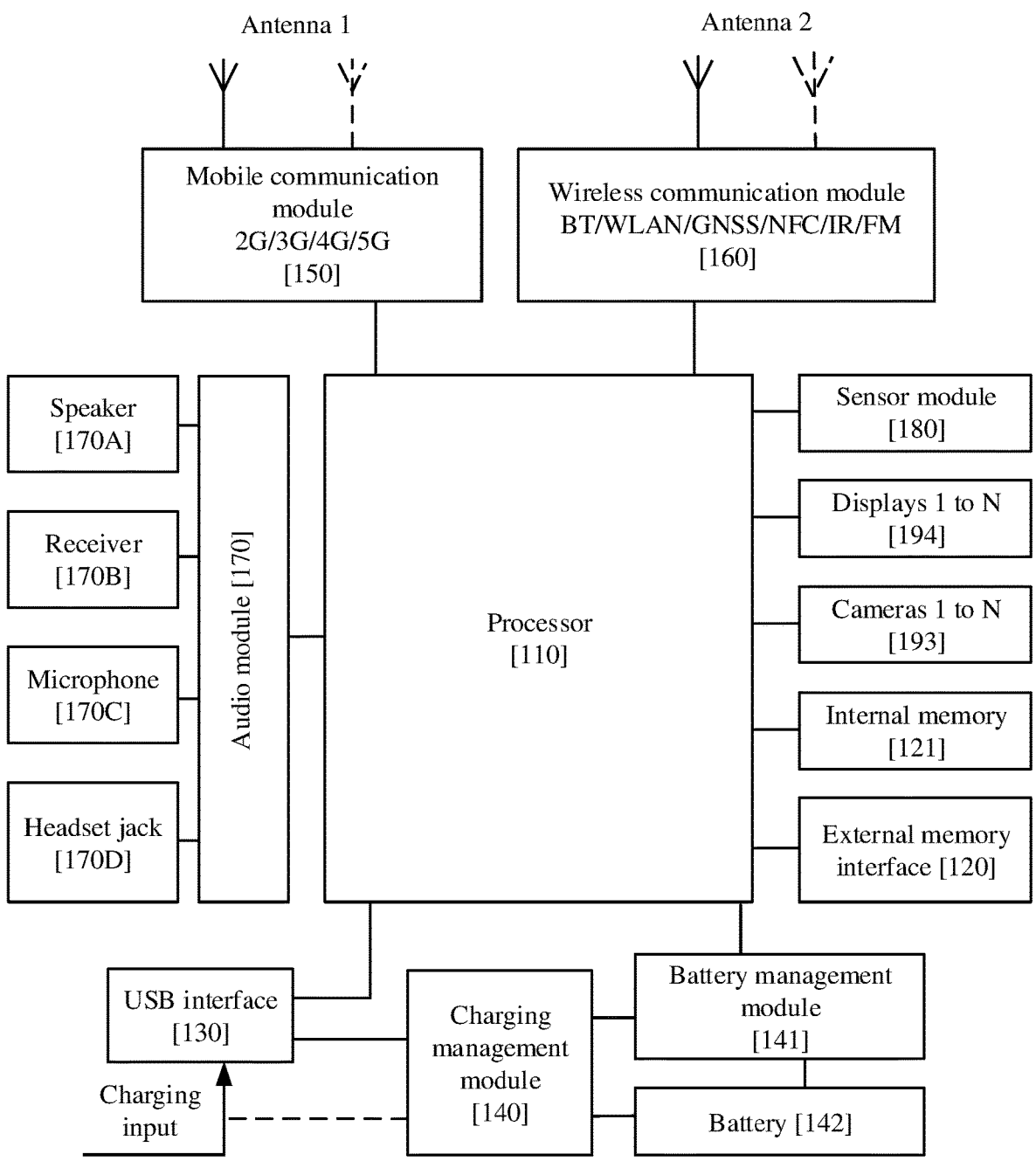
FIG. 2 is a schematic diagram of a structure of an electronic device according to an embodiment of this application.

The first electronic device 10 supports a data access protocol, and may serve as a server to provide data. For example, the first electronic device 10 may be a mobile phone, a tablet computer, or the like. A specific structure of the first electronic device 10 is shown in FIG. 2, and is specifically described in the following embodiment. The second electronic device 20 also supports the data access protocol, and may serve as a client to access data in the first electronic device 10. In some embodiments, the second electronic device 20 may be specifically a mobile phone or a computer. The computer may be a desktop computer, or may be a notebook computer, for example, a Mac notebook computer of Apple or a Windows notebook computer of Huawei™.

The first electronic device 10 and the second electronic device 20 may be connected to the cloud server 30 over the network 40. A manner of connecting the electronic device to the cloud server 30 over the network 40 may include wired or wireless connection. The cloud server is configured to store data uploaded by another electronic device. The first electronic device 10 or the second electronic device 20 may store data of the first electronic device 10 or the second electronic device 20 including an application, a program parameter, a file, and the like on the cloud server 30. The first electronic device 10 or the second electronic device 20 may also download, from the cloud server 30, data stored on the cloud server 30. The cloud server 30 may include Huawei Cloud, Amazon™, Alibaba Cloud, Tencent Cloud, Baidu Cloud, and the like.

It may be understood that, in some cases, the system architecture includes at least two electronic devices, and the first electronic device 10 and the second electronic device 20 communicate with each other. Alternatively, in some cases, the system architecture includes only an electronic device and the cloud server 30, and there is at least one electronic device.

In some embodiments of this application, the first electronic device 10 or the second electronic device 20 may be a portable electronic device that further includes another function such as a function of a personal digital assistant and/or a function of a music player, for example, a wearable device (such as a smartwatch) having a wireless communication function. The portable electronic device may be alternatively another portable electronic device, for example, a laptop computer with a touch-sensitive surface (for example, a touch panel). It should be further understood that, in some other embodiments of this application, the first electronic device 10 may be not a portable electronic device, but a desktop computer, a digital camera, a sound box, a smart screen, an in-vehicle machine, or the like.

With reference to FIG. 2, an example in which the electronic device is a mobile phone is used. A person skilled in the art may understand that the mobile phone shown in FIG. 2 is merely an example, and does not constitute limitation on the mobile phone. The mobile phone may have more or fewer components than those shown in the figure.

For example, FIG. 2 is a schematic diagram of a structure of an electronic device according to an embodiment of this application.

The electronic device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a camera 193, a display 194, and the like.

It may be understood that the structure illustrated in this embodiment of the present disclosure does not constitute specific limitation on the electronic device. In other embodiments of this application, the electronic device may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processor (NPU). Different processing units may be independent components, or may be integrated into one or more processors.

A memory may be further disposed in the processor 110, and is configured to store instructions and data. In some embodiments, the memory in the processor 110 is a cache. The memory may store an instruction or data that is just used or cyclically used by the processor 110. If the processor 110 needs to use the instruction or the data again, the processor may directly invoke the instruction or the data from the memory. This avoids repeated access, reduces a waiting time of the processor 110, and improves system efficiency.

In some embodiments, the processor 110 may include one or more interfaces. The interface may include an integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device. The charging management module 140 supplies power to the electronic device through the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may be alternatively disposed in a same device.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that includes wireless communication such as 2G/3G/4G/5G and that is applied to the electronic device. The mobile communication module 150 may include one or more filters, one or more switches, one or more power amplifiers, one or more low noise amplifiers (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in the same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in the same device as the mobile communication module 150 or another functional module.

The wireless communication module 160 may provide wireless communication solutions that are applied to the electronic device and that include a wireless local area network (WLAN) (such as a wireless fidelity (Wi-Fi) network), Bluetooth (BT), a global navigation satellite system (GNSS), frequency modulation (FM), a near field wireless communication (NFC) technology, an infrared technology (IR), and the like. The wireless communication module 160 may one or more components integrated with one or more communication processing modules. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like. The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. In this way, the electronic device may play or record videos in a plurality of coding formats, for example, moving picture experts group (MPEG) MPEG-1, MPEG-2, MPEG-3, and MPEG-4.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device performs the projection display method provided in some embodiments of this application, various functional applications, data processing, and the like. The internal memory 121 may include a program storage area and a data storage area. The program storage area may store an operating system. The program storage area may further store one or more applications (for example, Gallery and Contacts), and the like. The data storage area may store data (for example, Photos and Contacts) created during use of the electronic device. In addition, the internal memory 121 may include a high-speed random access memory, and may further include a non-volatile memory, such as one or more disk storage components, a flash memory, or a universal flash storage (UFS). In some other embodiments, the processor 110 runs the instructions stored in the internal memory 121 and/or the instructions stored in the memory disposed in the processor, so that the electronic device performs the projection display method provided in embodiments of this application, various functional applications, and data processing.

The electronic device may implement audio functions by using the audio module 170, the speaker 170A, the receiver 170B, the microphone 170C, the headset jack 170D, the application processor, and the like, for example, music playback and sound recording. The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110. The speaker 170A, also referred to as a "loudspeaker", is configured to convert an audio electrical signal into a sound signal. The electronic device may be used to listen to music or answer a hands-free call by using the speaker 170A. The receiver 170B, also referred to as an "earpiece", is configured to convert an electrical audio signal into a sound signal. When a call is answered or voice information is received by using the electronic device, the receiver 170B may be put close to a human ear to receive a voice. The microphone 170C, also known as "microphone", "microphone", is configured to convert a sound signal into an electrical signal. When making a call or sending a voice message, a user may make a sound near the microphone 170C through the mouth of the user, to input a sound signal to the microphone 170C. One or more microphones 170C may be disposed in the electronic device. In some other embodiments, two microphones 170C may be disposed in the electronic device, to implement a noise reduction function in addition to capturing a sound signal. In some other embodiments, three, four, or more microphones 170C may be alternatively disposed in the electronic device, to capture a sound signal, reduce noise, identify a sound source, implement a directional recording function, and the like. The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like. The touch sensor may be disposed on the display. The touch sensor and the display form a touch-screen that is also referred to as a "touch screen".

In addition, the electronic device may further include one or more components such as a button, a motor, an indicator, and a SIM card interface. This is not limited in embodiments of this application.

A software system of the electronic device may use a layered architecture, an event-driven architecture, a micro-kernel architecture, a microservice architecture, or a cloud architecture. In embodiments of this application, a software structure of the electronic device is described by using an Android™ system with a layered architecture as an example.

Figure 3:
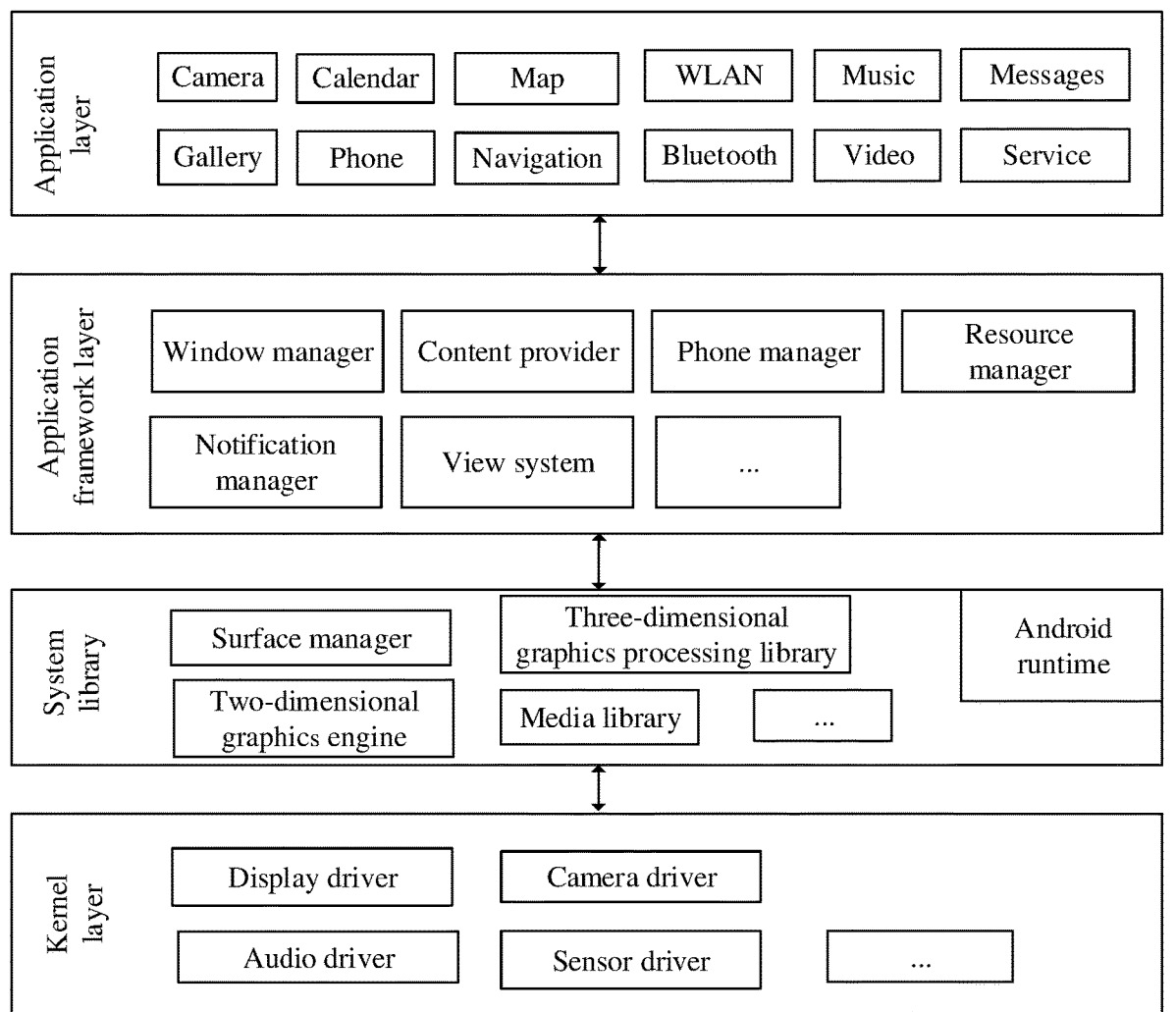
FIG. 3 is a block diagram of a software structure of an electronic device according to an embodiment of this application.

FIG. 3 is a block diagram of a software structure of an electronic device according to an embodiment of this application.

In a layered architecture, software is divided into several layers, and each layer has a clear role and task. The layers communicate with each other through a software interface. In some embodiments, the Android™ system is divided into four layers: an application layer, an application framework layer, an Android™ runtime and system library, and a kernel layer from top to bottom.

The application layer may include a series of application packages. As shown in FIG. 3, the application packages may include applications such as Camera, Gallery, Calendar, Phone, Map, Navigation, WLAN, Bluetooth, Music, Video, Messages, and Service.

In some embodiments of this application, the application layer is mainly responsible for presenting a Settings UI. The settings UI may be used by a user to set a data protection function of the electronic device. For example, the user may enable or disable the data protection function on the Settings UI.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data accessible to an application. The data may include a video, an image, an audio, calls that are made and answered, a browsing history and bookmarks, a phone book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without a user interaction. For example, the notification manager is configured to notify download completion, give a message notification, and the like. The notification manager may be alternatively a notification that appears in a top status bar of the system in a form of a graph or a scroll bar text, for example, a notification of an application running on a background, or may be a notification that appears on the screen in a form of a dialog window. For example, text information is displayed in the status bar, an announcement is given, the electronic device vibrates, or an indicator light blinks.

In this embodiment of this application, the data protection function may be implemented as a function of the electronic device, or may be implemented as a sub-function of original data protection in the electronic device. For example, the data protection function is implemented as a sub-function of a service application function of a Huawei™ mobile phone, or is implemented as a function of a maintenance mode function of a Huawei mobile phone.

The Android™ runtime includes a kernel library and a virtual machine. The Android™ runtime is responsible for scheduling and management of the Android™ system.

The kernel library includes two parts: a function that needs to be invoked in Java language and a kernel library of Android™.

The application layer and the application framework layer are run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL). The surface manager is configured to: manage a display subsystem and provide fusion of 2D and 3D layers for a plurality of applications. The media library supports playback and recording in a plurality of commonly used audio and video formats, and static image files. The media library may support a plurality of audio and video coding formats, for example, MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device with reference to an image capturing scenario.

When the touch sensor receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a tap operation, and a control corresponding to the tap operation is a control of a service application icon. The service application invokes an interface of the application framework layer to start the service application, thereby providing a data protection function for the user.

It should be emphasized that FIG. 3 is merely a schematic example. The software structure of the electronic device provided in this embodiment of this application may alternatively use another software architecture, for example, a software architecture of iOS®, Harmony®, Windows®, Linux, or another operating system.

In the conventional technologies, when the electronic device is faulty, the user takes the electronic device to maintenance personnel for repair. In this case, the maintenance personnel need to ask the user for a corresponding password, for example, a power-on password, to unlock the electronic device. After the electronic device is unlocked, the maintenance personnel can obtain privacy data in the electronic device, for example, view a chat record or export an image in a gallery. As a result, the privacy data of the user is leaked. Alternatively, in some cases, when the electronic device of the user is used by another person, the another person may also obtain privacy data such as a chat record in the electronic device.

In view of this, this application provides a data protection method, to protect privacy data of an electronic device. Another person may operate the electronic device and use original functions of the electronic device. However, the privacy data in the electronic device is securely isolated, and the another person cannot access and obtain the privacy data of the user in the electronic device.

Embodiment 1

Figure 4:
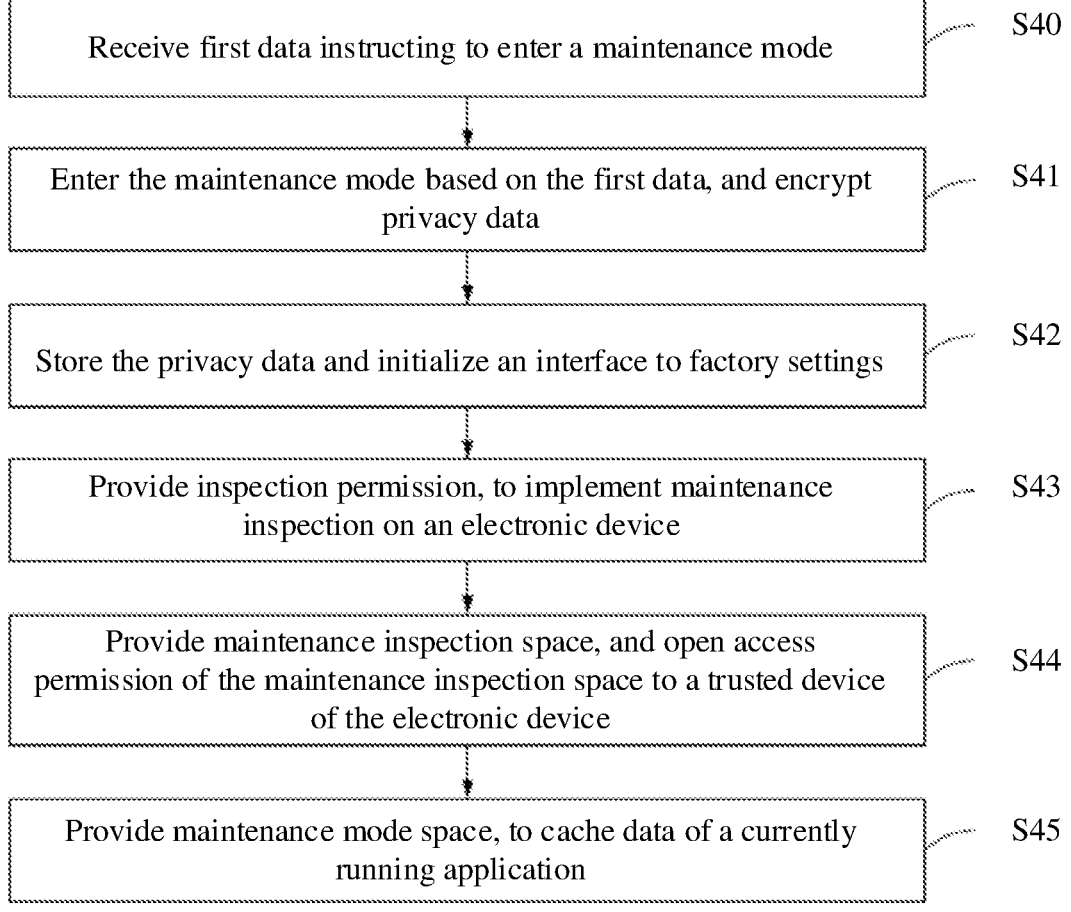
FIG. 4 is a schematic flowchart of a data protection method according to an embodiment of this application.

FIG. 4 is a schematic flowchart of a data protection method according to an embodiment of this application. The method may be applied to an electronic device or a cloud server. The method includes the following steps.

Step S40: Receive first data instructing to enter a maintenance mode.

In this embodiment of this application, the electronic device or the cloud server may receive the first data from another electronic device. The first data is used to trigger the electronic device or the cloud server that receives the first data, to enter the maintenance mode. For example, when a first electronic device is communicatively connected to a second electronic device, the first electronic device receives first data from the second electronic device, and the first electronic device enters a maintenance mode based on the received first data. When the cloud server is communicatively connected to the first electronic device, the cloud server receives first data sent by the first electronic device, and the cloud server enters the maintenance mode based on the received first data. In other words, the electronic device or the cloud server may receive the first data sent by the another electronic device in networking. The another electronic device in the networking may include the electronic device and the cloud server. Alternatively, the electronic device or the cloud server may directly receive first data entered by a user, for example, the first data input by using a UI interface. In this case, the electronic device or the cloud server enters the maintenance mode based on the received first data. This is not specifically limited in this application.

Figure 5A:
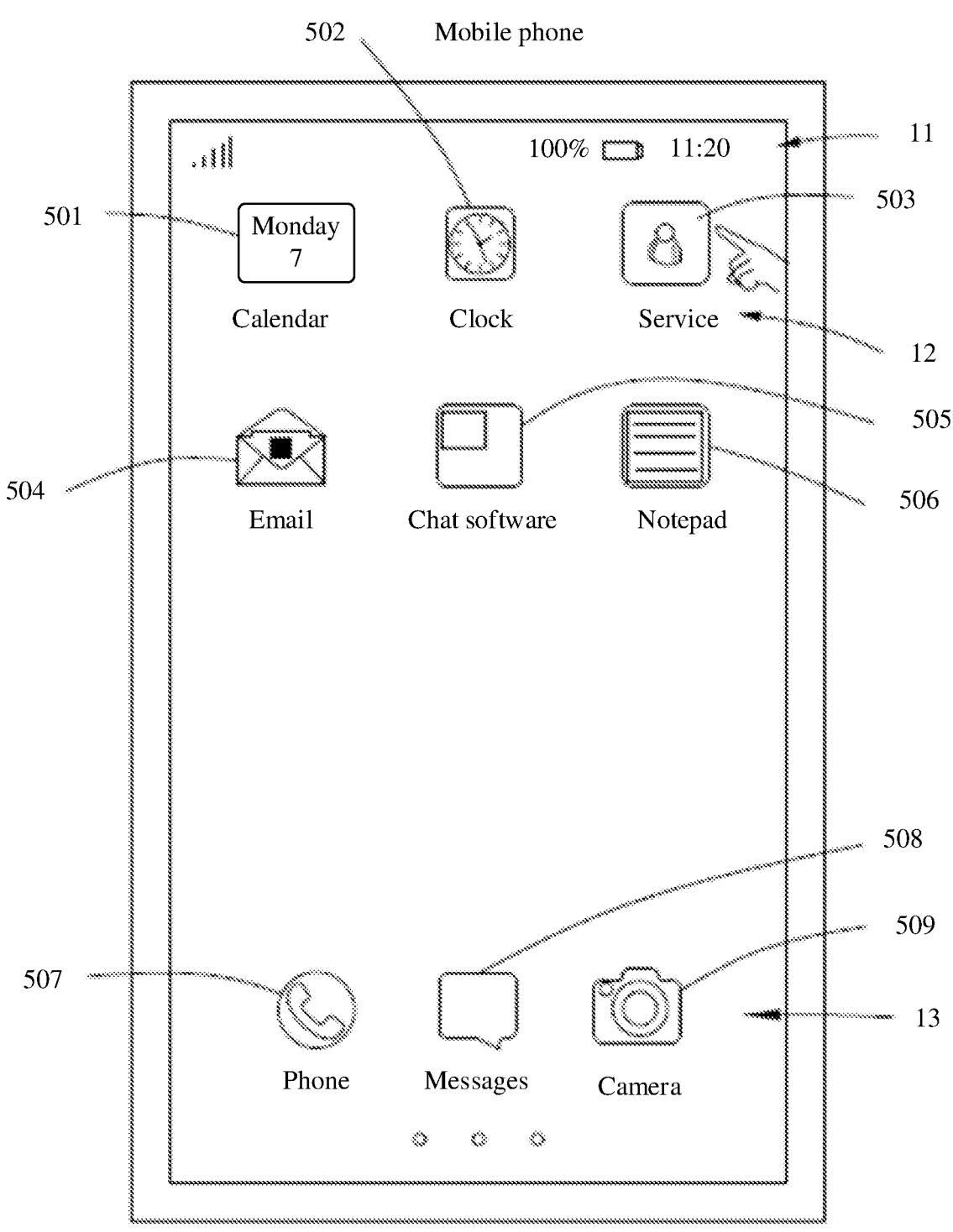
FIG. 5*a* is a schematic diagram of a home screen before maintenance according to an embodiment of this application.
Figure 5B:
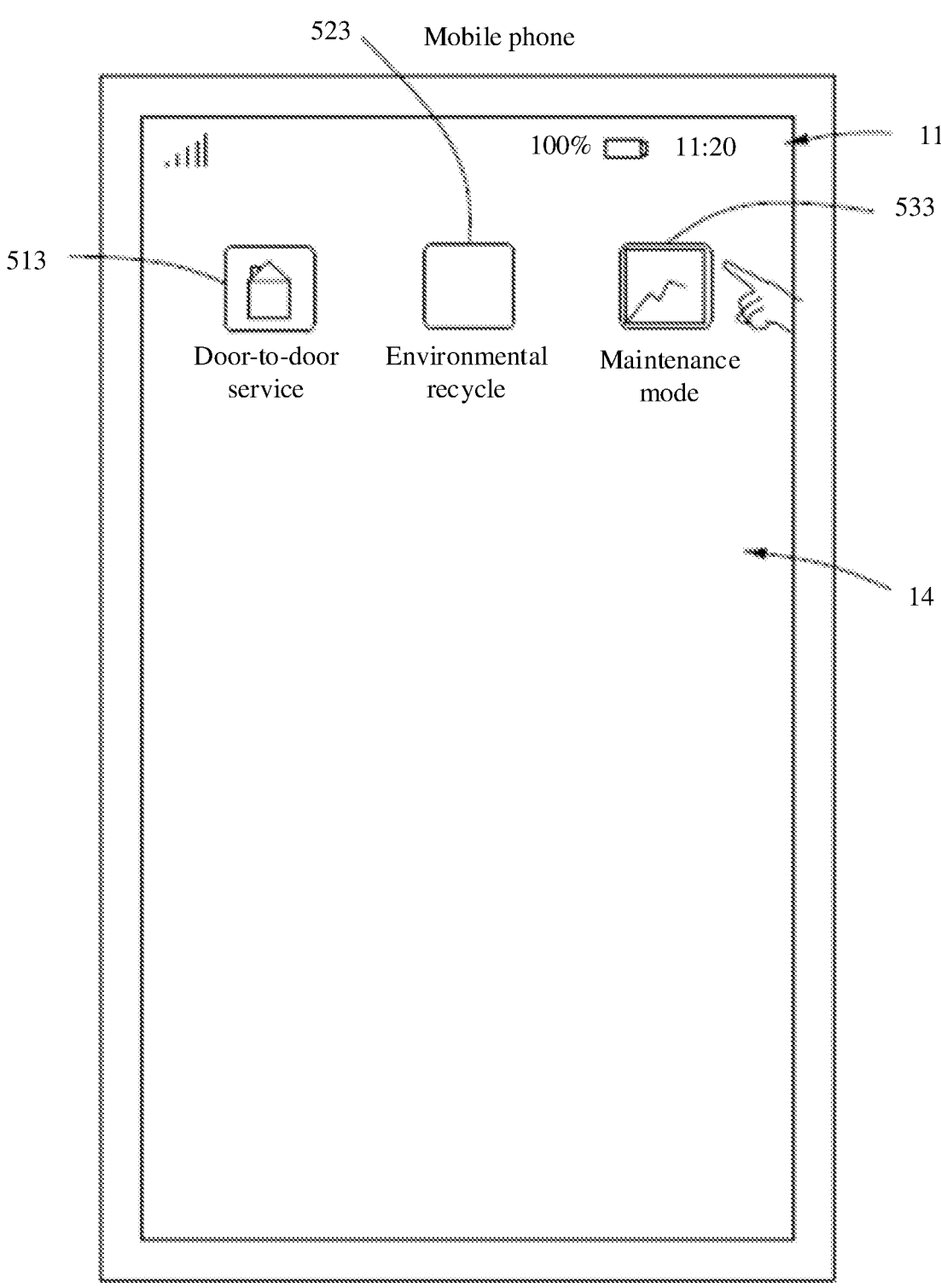
FIG. 5*b* is a schematic diagram of a service application interface according to an embodiment of this application.

For example, the electronic device is a mobile phone, and the mobile phone receives the first data entered by the user. Before the mobile phone enters the maintenance mode, a home screen of the mobile phone is a first home screen 12. As shown in FIG. 5a, the screen of the mobile phone includes a status bar 11, a first home screen 12, and a dock bar 13. The status bar 11 may include a name of an operator (for example, China Mobile), time, signal strength, a current battery level, and the like. The first home screen 12 includes applications. These applications include an embedded application and a downloadable application. As shown in FIG. 5a, the first home screen 12 includes a Calendar icon 501, a Clock icon 502, a Services icon 503, an Email icon 504, a Chat Software icon 505, a Notepad icon 506, and the like. The dock bar 13 includes commonly used applications, such as a Phone icon 507, a Messages icon 508, and a Camera icon 509.

The user taps the Services icon 503 on the first home screen 12, to enter a service application. As shown in FIG.

5b, the service application presents a service application interface, including a status bar 11 and a service application interface 14. The status bar 11 is similar to that in FIG. 5a. Details are not described herein again. The service application interface 14 includes corresponding service function icons, such as a door-to-door service icon 513, an environmental recycle icon 523, and a maintenance mode icon 533. The user taps the maintenance mode icon 533. The user inputs an instruction for instructing the mobile phone to enter the maintenance mode, that is, inputs, to the mobile phone, the first data for triggering the mobile phone to enter the maintenance mode. After receiving the first data, the mobile phone enters the maintenance mode. In this embodiment of this application, the first data includes information instructing an electronic device to enter a maintenance mode.

Step S41: Enter the maintenance mode based on the first data, and encrypt privacy data.

In this embodiment of this application, the privacy data is determined, and then the determined privacy data is encrypted by using a secure encryption algorithm, to implement comprehensive isolation of the privacy data. The privacy data may be privacy of the user, for example, personal information of the user or sensitive data of the user. The privacy data may be understood as data recorded when the user performs an operation on a new electronic device. The privacy data includes but is not limited to an application downloaded by the user or data generated when the user uses an application, for example, third-party software downloaded by the user, or data entered by the user on third-party software, or data entered by the user on an embedded application, or data received by the user through third-party software, or data received by the user through an embedded application.

For example, the privacy data includes an application downloaded by the user, for example, payment software, social software, or photographing beautification software. The privacy data includes data generated when the user uses a third-party application, for example, a chat record on the social software, or an image or a video taken by the user through the photographing beautification software. The privacy data includes data generated when the user uses an embedded application, for example, an image or a video in a local album of the mobile phone, mail files in an email, data recorded in Notepad, contact information recorded in an address book, and voice recorded in a sound record.

In this embodiment of this application, an algorithm for encrypting the determined privacy data includes but is not limited to AES 256, RSA 1024, and the like. This is not specifically limited in this application.

Step S42: Store the privacy data and initialize an interface to factory settings.

In this embodiment of this application, when the electronic device enters the maintenance mode, the electronic device may encrypt the privacy data, and then store the encrypted privacy data in preset storage space or store the privacy data in preset storage space. When the electronic device enters the maintenance mode or is in the maintenance mode, the preset storage space in the electronic device cannot be accessed, and an interface of the electronic device is "initialized" to factory settings. In other words, the related privacy data is hidden, and the preset storage space cannot be accessed through the interface of the electronic device, so that the privacy data cannot be accessed and obtained by using an application. To be specific, after the interface of the electronic device is initialized, all the privacy data is hidden and not displayed, all downloaded applications are hidden and cannot be accessed, and data recorded in embedded applications is also hidden and not displayed. When the electronic device exits the maintenance mode, the preset storage space in the electronic device is released, and the privacy data stored in the preset storage space may be recovered. Before the interface of the electronic device is also recovered to the interface of the electronic device before entering the maintenance mode, the user may obtain the privacy data through an application.

Figure 6A:
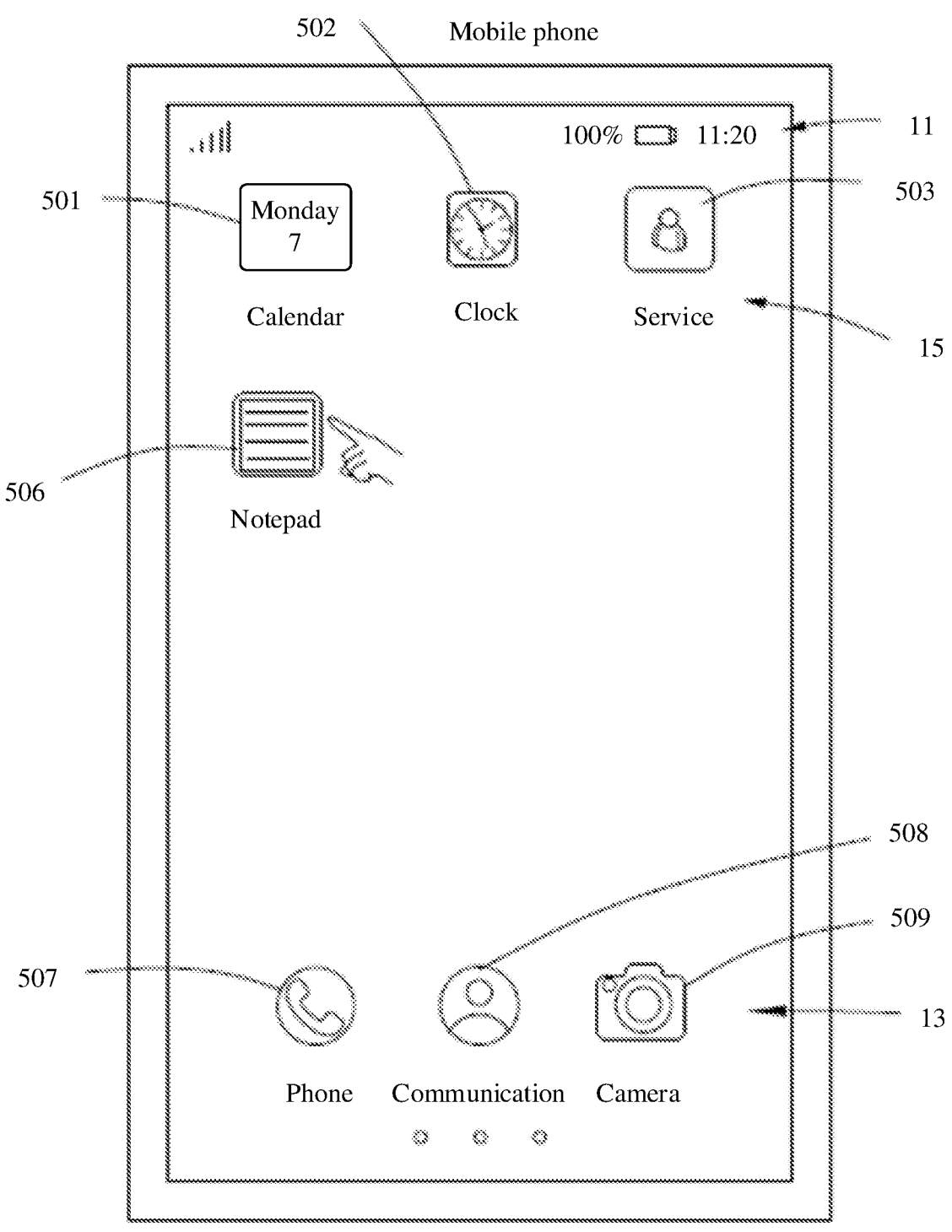
FIG. 6*a* is a schematic diagram of a home screen after maintenance according to an embodiment of this application.

For example, the electronic device is a mobile phone, and the first home screen 12 of the mobile phone before entering the maintenance mode is shown in FIG. 5a. After the mobile phone enters the maintenance mode, a home screen of the mobile phone is a second home screen 15, and the second home screen 15 is shown in FIG. 6a. After the mobile phone enters the maintenance mode, the Email icon 504 and the Chat Software icon 505 that are originally presented on the first home screen 12 are not presented on the second home screen 15. The Email application and the Chat Software application are both hidden. The downloaded application software cannot be found on the mobile phone operated by the user. In a possible implementation, a wallpaper is originally set on the first home screen 12, and after the mobile phone enters the maintenance mode, the wallpaper on the second home screen 15 is initialized to a wallpaper of the mobile phone at delivery.

Figure 6B:
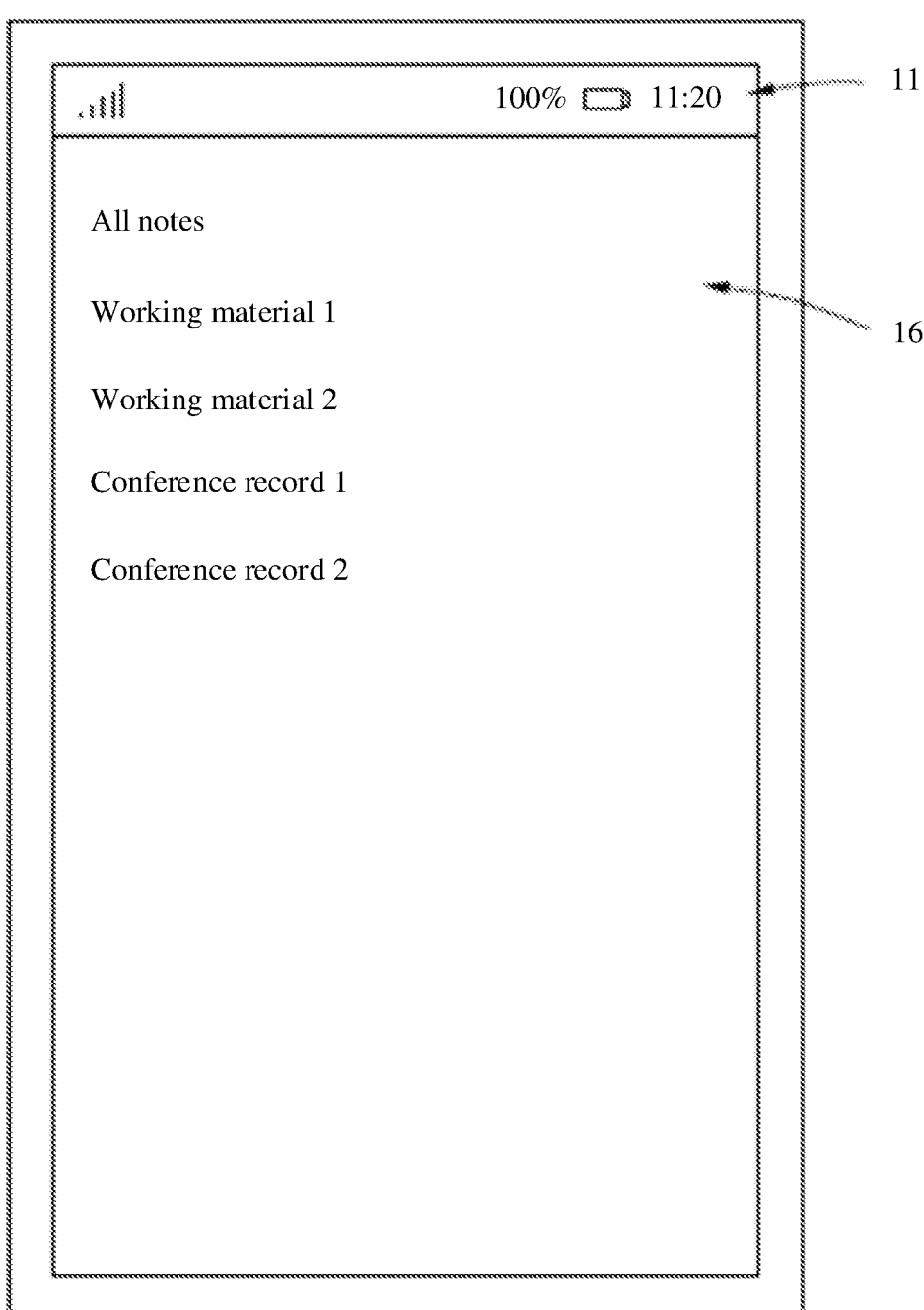
FIG. 6*b* is a schematic diagram of a Notepad interface before maintenance according to an embodiment of this application.
Figure 6C:
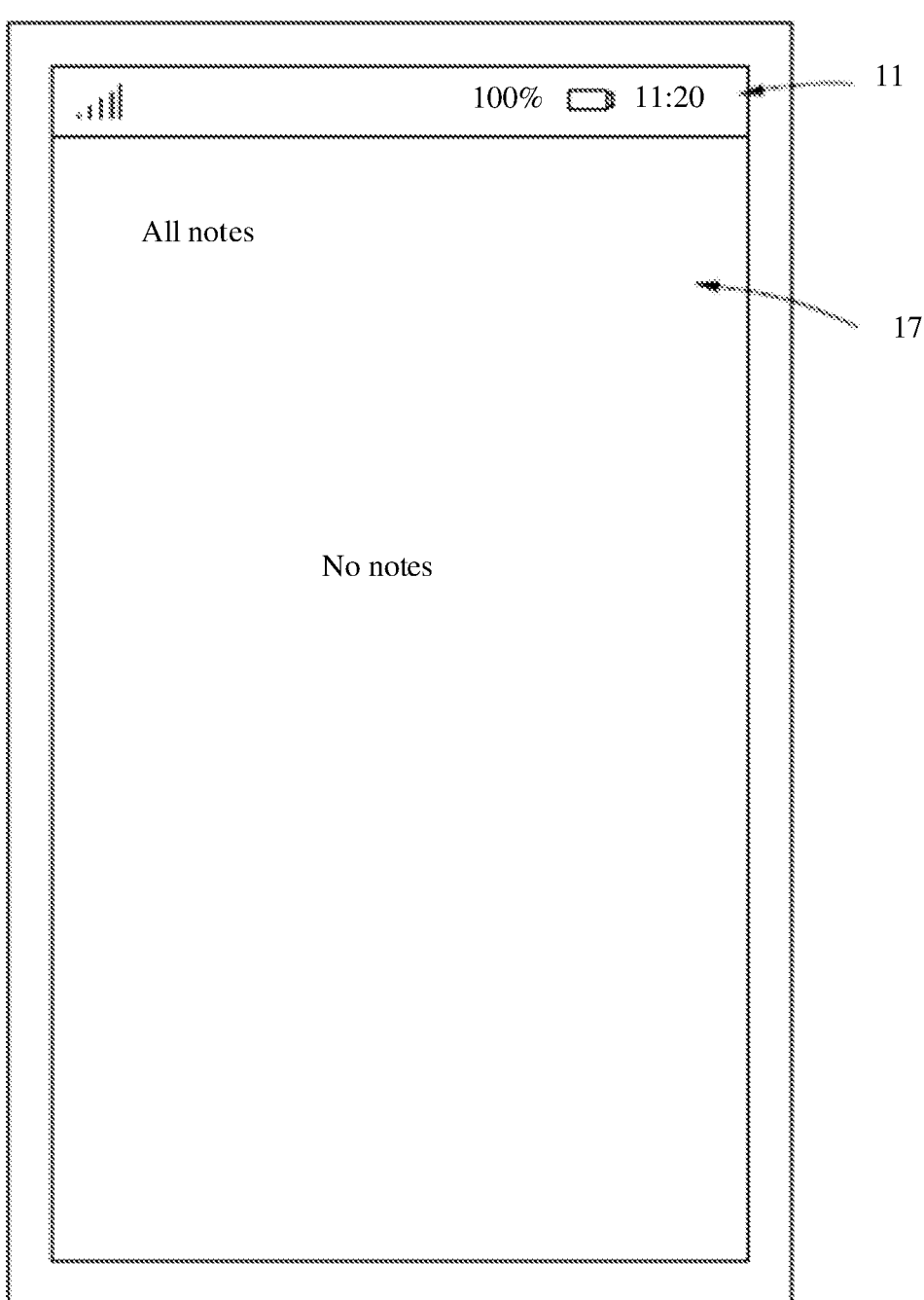
FIG. 6*c* is a schematic diagram of a Notepad interface after maintenance according to an embodiment of this application.

In a possible implementation, operation data of the user for the embedded application is also hidden. The user records some note information through Notepad. As shown in FIG. 6a, the user taps the Notepad icon 506 on the second home screen 15 to enter the Notepad application. The mobile phone does not enter the maintenance mode. As shown in FIG. 6b, an application interface of Notepad on the mobile phone is a first application interface 16 of Notepad, and corresponding note information is displayed in the first application interface 16 of Notepad. As shown in FIG. 6c, after the mobile phone enters the maintenance mode, an application interface of Notepad is a second application interface 17 of Notepad, and the note information is hidden in the second application interface 17 of Notepad. In a possible implementation, the user stores image or video information in the gallery. After the mobile phone enters the maintenance mode, all data originally stored in the gallery by the user is hidden, and the image or the video cannot be viewed.

Step S43: Provide inspection permission, to implement maintenance inspection on the electronic device.

In this embodiment of this application, when the electronic device needs to be inspected, the inspection permission may be further provided for an inspection device, so that the inspection device can inspect the electronic device, thereby implementing maintenance inspection on the electronic device. The inspection permission includes but is not limited to component inspection interface permission, component node access permission, and log storage area access permission. For example, the inspection interface permission may be provided to perform an interface test on an interface of the electronic device, to inspect interaction points between another external system and a system of the electronic device and between subsystems in the system of the electronic device. The component node access permission may be provided to access a component in the electronic device, determine, by using a component node, a component represented by the component node, and inspect the component. The log storage area access permission may be provided to provide access permission to a public log area of the electronic device and obtain related log information.

Access control permission is set for the public log area. For example, if a corresponding application is in a maintenance mode, the application can have the access control permission for the public log area. The corresponding application in the maintenance mode may be that the data protection function in this application is implemented as a sub-function of the service application function in FIG. 5a, for example, the "maintenance mode". Alternatively, the data protection function in this application may be implemented as an application, for example, implemented as a "maintenance mode" application. The corresponding application in the maintenance mode may be used as third-party software or an embedded application. For example, there is a "maintenance mode application" on the electronic device, and permission is set for a user ID (UID) or a group ID (GID) of the maintenance mode application. For example, a maintenance mode application whose GID is equal to 1000_127 is allowed to access the public log area. The user taps the maintenance mode application, and then the user can access the public log area by using the maintenance mode application.

For example, when inspection needs to be performed to determine whether a camera of the electronic device can perform photographing, permission of the camera needs to be provided to the inspection device, so that inspection personnel can control the inspection device to inspect a function of the camera of the electronic device.

Step S44: Provide maintenance inspection space, and open access permission of the maintenance inspection space to a trusted device of the electronic device.

In this embodiment of this application, when the electronic device needs to be inspected, the electronic device may further provide the maintenance inspection space. New space, namely, the maintenance inspection space, is applied for in a storage area of the electronic device. The maintenance inspection space may be used to store maintenance inspection data during maintenance inspection. Data generated in the maintenance mode is stored in the maintenance inspection space.

Step S45: Provide maintenance mode space, to cache data of a currently running application.

In this embodiment of this application, when content of the currently running application on the electronic device needs to be cached, the maintenance mode space is provided, so that the content of the currently running application may be further cached in the maintenance mode space after the electronic device enters the maintenance mode. Specifically, it is detected that there is the running application on the current electronic device. Other new memory space is applied for, that is, the maintenance mode space. Content of the currently running application is cached in the maintenance mode space. Therefore, after the electronic device enters the maintenance mode, a file directory in the maintenance mode is automatically generated, and a path of the maintenance mode is created to the maintenance mode space. In this way, a database and playlist information are read from the maintenance mode space, and the content of the application is directly read in the maintenance mode. The application may be a video playing application. After the electronic device enters the maintenance mode, a corresponding video may continue to be played.

It may be understood that steps performed for entering the maintenance mode include but are not limited to the foregoing steps and sequences. In some scenarios, the execution steps may be properly adjusted, or corresponding steps may be properly omitted. It may be understood that the foregoing steps may also be performed in the maintenance mode.

Figure 7A:
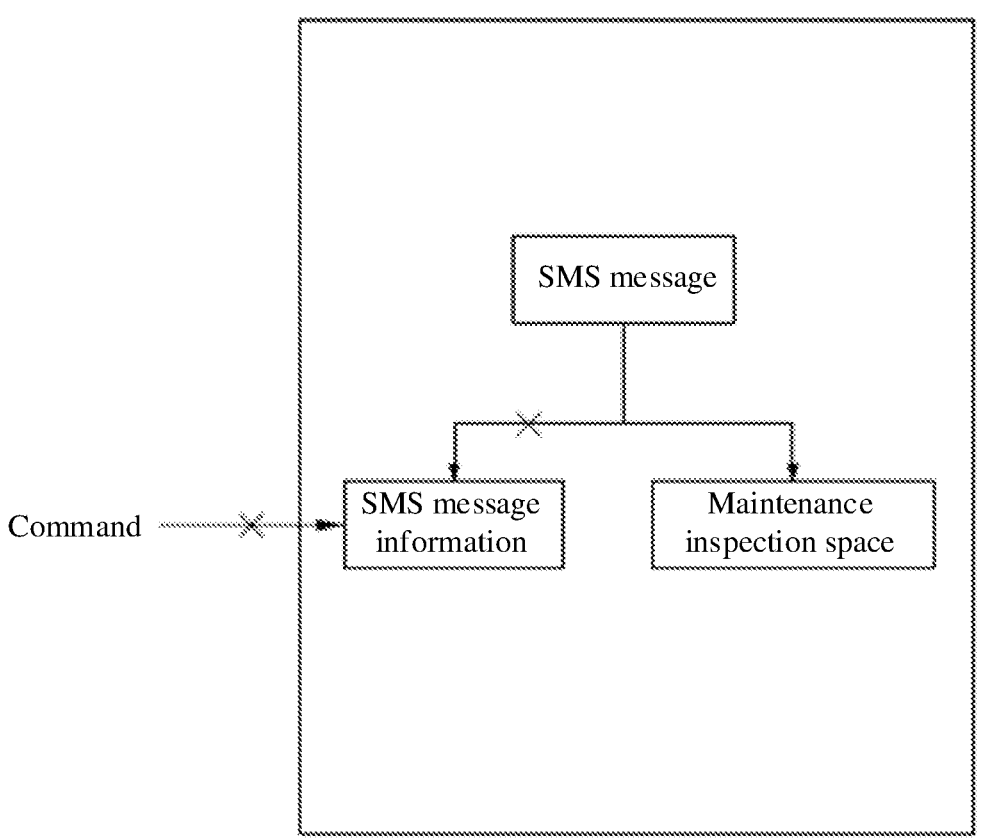
FIG. 7*a* is a schematic diagram of accessing data by using a common application in a maintenance mode according to an embodiment of this application.
Figure 7B:
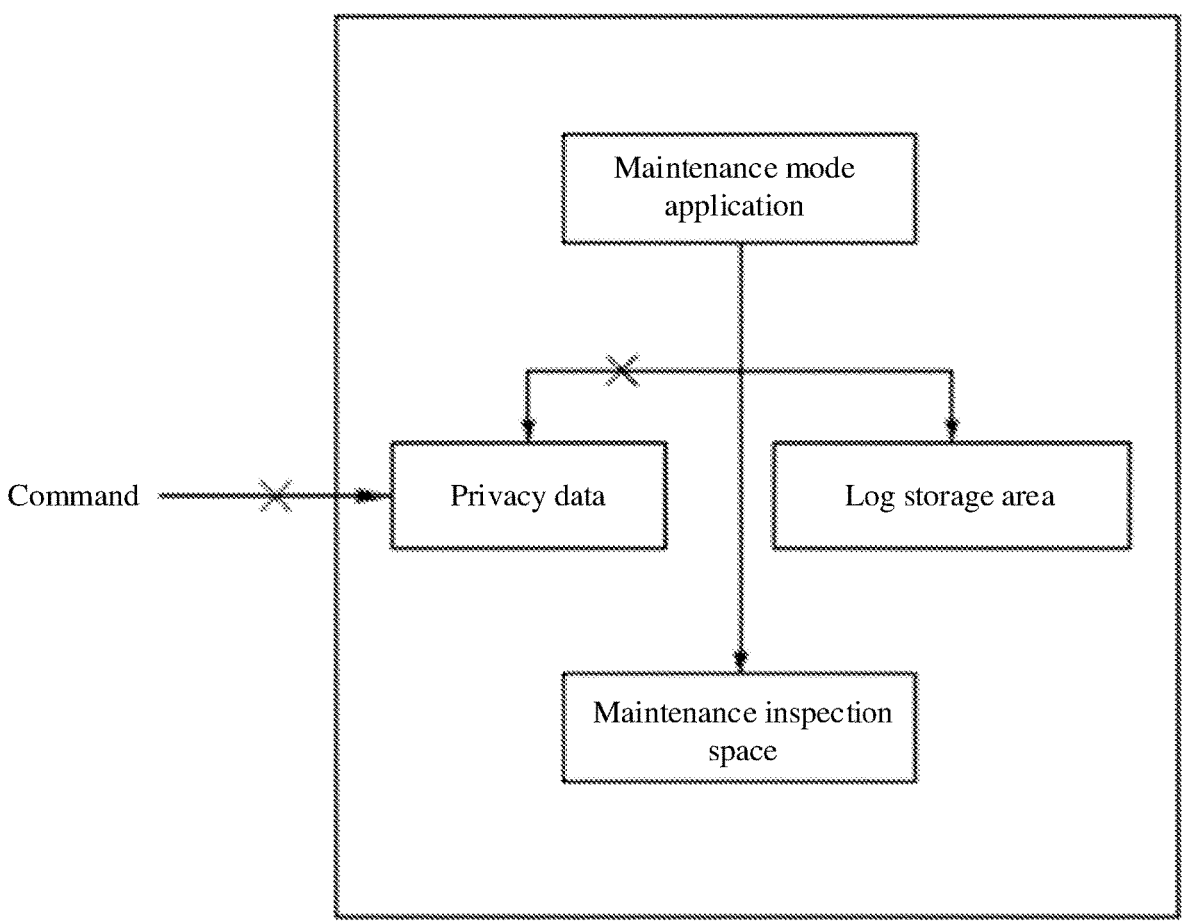
FIG. 7*b* is a schematic diagram of accessing data by using a maintenance mode application in a maintenance mode according to an embodiment of this application.

Refer to both FIG. 7a and FIG. 7b. FIG. 7a shows a scenario of accessing data by a common application after a mobile phone enters a maintenance mode. In this scenario, a Messages application cannot access data such as SMS message information that is of an owner of the mobile phone and that is stored in the mobile phone, but the Messages application can access the maintenance inspection space. The common application means an application other than a maintenance mode application in applications on the mobile phone after the electronic device enters the maintenance mode. FIG. 7b shows a scenario of accessing data by a maintenance mode application after a mobile phone enters a maintenance mode. In this scenario, the maintenance mode application cannot access privacy data that is of an owner of the mobile phone and that is stored in the mobile phone, but the maintenance mode application can access the content in the maintenance inspection space and the log storage area. To be specific, after the mobile phone enters the maintenance mode, when operating the electronic device, an operator cannot access the privacy data of the owner by using a common application, but can access the maintenance inspection space by using a common application. For example, for a camera application, detected camera-related data may be stored in the maintenance inspection space. The maintenance mode application may further access the log storage area. As shown in FIG. 7a and FIG. 7b, after the mobile phone enters the maintenance mode, the privacy data is encrypted and stored in preset storage space, and the privacy data cannot be accessed by using an external command. For example, an image or a video cannot be obtained by using an adb command.

The following describes in detail the data protection method in Embodiment 1 with reference to a specific application scenario.

In a first scenario, a user takes a mobile phone with a faulty camera for repair. The user taps a maintenance mode application on the mobile phone, and the mobile phone enters a maintenance mode. Privacy data of the user on the mobile phone is hidden. Maintenance personnel cannot view the privacy data of the user when repairing the mobile phone. The mobile phone provides component inspection interface permission, component node access permission, and log storage area access permission. The maintenance personnel can inspect the camera. After the mobile phone is repaired, the user exits the maintenance mode, and data in the mobile phone is recovered. The user can normally use the mobile phone and access the privacy data.

In a second scenario, a user hands a friend a tablet of the user to play, but the user does not want the friend to view personal privacy data of the user. In this case, the user may set the tablet to a maintenance mode. In this case, the friend of the user cannot access the personal privacy data of the user, but can operate and use the tablet. For example, the friend of the user can normally use applications on the tablet, such as Phone, Messages, Calendar, and Camera, but cannot access data of the applications, for example, cannot access information received and sent by the user by using the Messages application. In the maintenance mode, an application can be newly downloaded and used. For example, a chat application can be newly downloaded, but the chat application does not have data. Before entering the maintenance mode, the tablet normally plays a video. After the tablet enters the maintenance mode, data corresponding to the video is cached in the maintenance mode space. The video can be still normally played after a related database and playlist information are read from the maintenance mode space. After the user equipment exits the maintenance mode, the hidden data of the tablet can be recovered, and the private data can be accessed by using an application again.

When implementing embodiments of this application, the inventor finds that the foregoing data protection implements only data protection for a single electronic device. In a multi-device full scenario, after one electronic device establishes a communication connection to another electronic device, interconnection and interworking between the two electronic devices are implemented, and data of the another electronic device can be accessed and obtained by using the electronic device. For example, when the mobile phone establishes a communication connection to the tablet, and the mobile phone can access data of the tablet. When maintenance is performed on the mobile phone, even if the mobile phone enters the maintenance mode, maintenance personnel can obtain the data on the tablet by using the mobile phone.

In view of this, this application provides another data protection method, to protect privacy data of an electronic device in the networking. Another person may operate the electronic device. However, the privacy data in the electronic device and privacy data in another electronic device networked with the electronic device are securely isolated, and the another person cannot access and obtain the privacy data of the user in the another electronic device in the networking.

Embodiment 2

Figure 8:
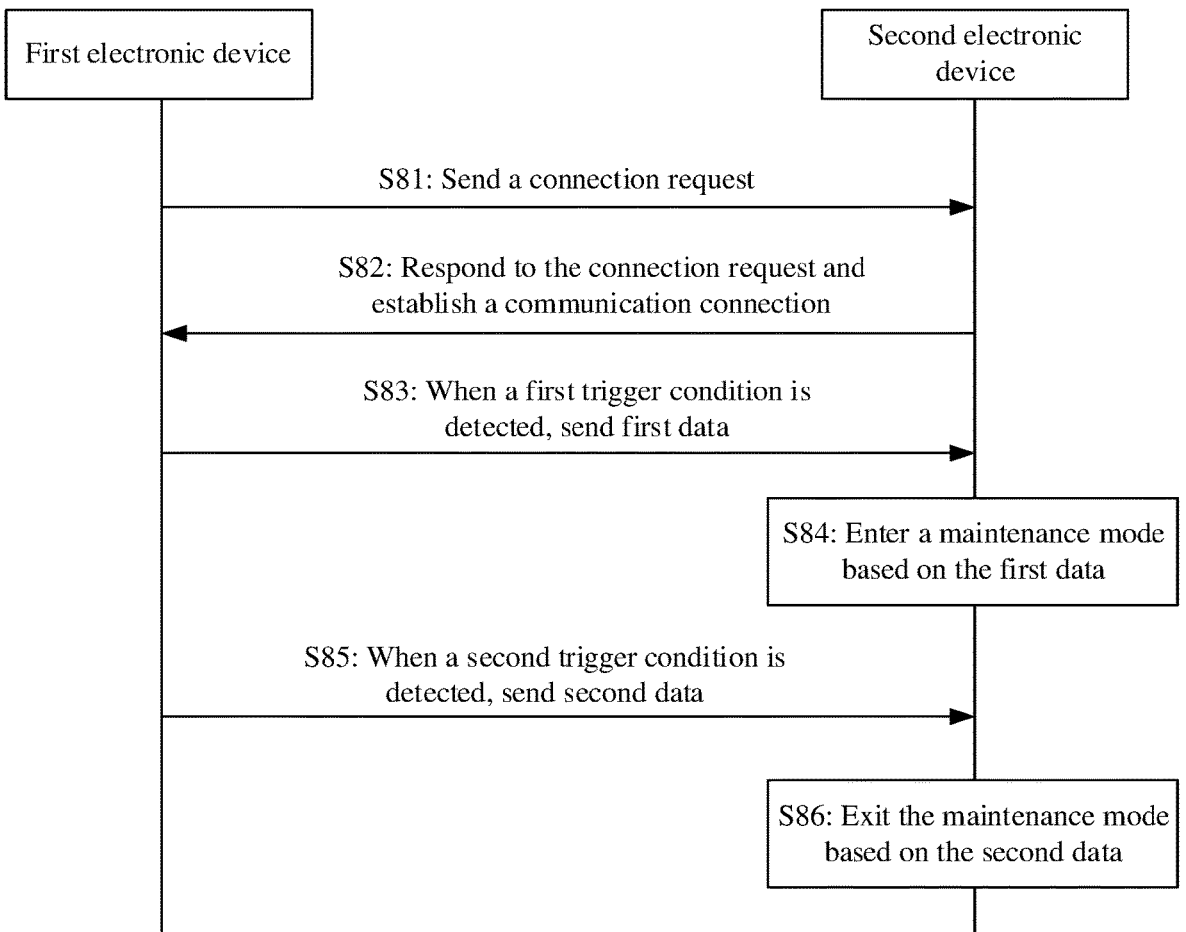
FIG. 8 is a schematic flowchart of another data protection method according to an embodiment of this application.

FIG. 8 is a schematic flowchart of another data protection method according to an embodiment of this application. The method may be applied to an electronic device or a cloud server. The method includes the following steps.

Step S81: A first electronic device sends a connection request to a second electronic device.

In this embodiment of this application, the first electronic device may include a terminal device or a cloud device, and the second electronic device may include a terminal device or a cloud device. The cloud device is, for example, a cloud server. The connection request may include device information and account information of the first electronic device.

It may be understood that a quantity of electronic devices networked with the first electronic device is not specifically limited. For example, the electronic devices may further include a third electronic device and a cloud server.

Step S82: The second electronic device responds to the connection request, and the first electronic device establishes a communication connection to the second electronic device.

In this embodiment of this application, the second electronic device verifies the account information in the connection request, to determine whether the first electronic device is an electronic device with a same account. When the first electronic device is an electronic device with the same account, it is determined that the first electronic device is a trusted device of the second electronic device. After verifying the account information, the second electronic device returns verification success information to the first electronic device, and the first electronic device establishes the communication connection to the second electronic device. When the second electronic device fails to verify the account information, the second electronic device returns verification failure information to the first electronic device, and the first electronic device fails to establish the communication connection to the second electronic device.

It may be understood that, if the second electronic device is a trusted device of the first electronic device, the first electronic device establishes the communication connection to the second electronic device. In other words, the communication connection includes a communication connection established after authentication between the first electronic device and the second electronic device succeeds.

In this embodiment of this application, electronic devices with the same account are trusted devices of each other, and the trusted device may further include an electronic device that passes the verification after authorization of a user. A communication connection may be established between trusted devices. If an electronic device and another electronic device are not trusted devices of each other, a connection between the two electronic devices is broken.

In this embodiment of this application, a connection manner between the first electronic device and the second electronic device includes a wired connection or a wireless connection.

In this embodiment of this application, that the first electronic device establishes the communication connection to the second electronic device is not limited to the following cases: The first electronic device sends a connection request to the second electronic device. Alternatively, the second electronic device may send a connection request to the first electronic device. The following steps may be performed after the communication connection is established.

Step S83: When detecting a first trigger condition, the first electronic device sends first data to the second electronic device. The first data is used to trigger the second electronic device to enter a maintenance mode.

In this embodiment of this application, after the authentication between the first electronic device and the second electronic device succeeds, and the first electronic device detects the first trigger condition, the first electronic device sends the first data to the second electronic device. The first trigger condition includes: the first electronic device is in a maintenance inspection state, or the first electronic device is in a maintenance mode, or the first electronic device enters a maintenance mode. The first data is used to trigger the second electronic device to enter the maintenance mode. The first data may include the following information: that the first electronic device enters the maintenance mode, or that the first electronic device is currently in the maintenance mode, or that the first electronic device is currently in the maintenance inspection state. That the first electronic device is currently in the maintenance inspection state is that the first device is currently maintained and inspected by the inspection device.

In this embodiment of this application, the first electronic device sends the first data to the second electronic device, to notify the second electronic device of a current state. The current state indicates, for example, that the first electronic device enters the maintenance mode, or the first electronic device is currently in the maintenance mode, or the first electronic device is currently in the maintenance inspection state. In this way, the second electronic device is triggered to enter the maintenance mode.

Step S84: The second electronic device enters the maintenance mode based on the first data.

In this embodiment of this application, the second electronic device enters the maintenance mode after receiving the first data. When the second electronic device obtains, from the first data, information that the first electronic device enters the maintenance mode, the second electronic device enters the maintenance mode. Alternatively, when the second electronic device obtains, from the first data, information that the first electronic device is in the maintenance mode, the second electronic device enters the maintenance mode. Alternatively, when the second electronic device obtains, from the first data, information that the first electronic device is currently in maintenance inspection, the second electronic device enters the maintenance mode. In this embodiment of this application, when the first electronic device is currently in the maintenance mode, or the first electronic device is currently in the maintenance inspection, or the first electronic device enters the maintenance mode, the first electronic device sends the first data to the second electronic device, and the second electronic device receives the first data sent by the first electronic device. In this way, the second electronic device is triggered to enter the maintenance mode. In other words, when the first electronic device is in the maintenance mode, or the first electronic device is in the maintenance inspection state, or the first electronic device enters the maintenance mode, based on interconnection and interworking between electronic devices, the second electronic device is also triggered to enter the maintenance mode after receiving the first data, to protect data of the second electronic device.

It may be understood that, when the first electronic device is in the maintenance mode, or the first electronic device enters the maintenance mode, or the first electronic device is currently in maintenance inspection, the first electronic device is in an insecure environment. In this case, the first electronic device sends the first data to an electronic device networked with the first electronic device. After receiving the first data, the electronic device networked with the first electronic device automatically enters the maintenance mode, and performs the steps in Embodiment 1, to protect data in another electronic device networked with the first electronic device.

Step S85: When detecting a second trigger condition, the first electronic device sends second data to the second electronic device. The second data is used to trigger the second electronic device to exit the maintenance mode.

In this embodiment of this application, the second trigger condition includes: the first electronic device currently exits the maintenance mode, or the first electronic device currently exits maintenance inspection. The second data may include the following information: that the first electronic device currently exits the maintenance mode, or that the first electronic device currently exits maintenance inspection.

In this embodiment of this application, the first electronic device sends the second data to the second electronic device, to notify the second electronic device of a current state. The current state indicates, for example, that the first electronic device currently exits the maintenance mode, or the first electronic device currently exits maintenance inspection. In this way, the second electronic device is triggered to exit the maintenance mode.

Step S86: The second electronic device exits the maintenance mode based on the second data.

In this embodiment of this application, when the second electronic device obtains, from the second data, information that the first electronic device exits the maintenance mode, the second electronic device exits the maintenance mode. Alternatively, when the second electronic device obtains, from the second data, information that the first electronic device exits maintenance inspection, the second electronic device exits the maintenance mode. In other words, when the first electronic device exits the maintenance mode, or the first electronic device exits maintenance inspection, the second electronic device is triggered to exit the maintenance mode.

In this embodiment of this application, when the first electronic device is in the insecure environment (the first electronic device is currently in the maintenance mode, or the first electronic device is currently in maintenance inspection, or the first electronic device enters the maintenance mode), the second electronic device may enter the maintenance mode based on the first data of the first electronic device, to protect data of the second electronic device, thereby avoiding a case in which privacy data in the second electronic device is leaked through the communication connection to the first electronic device. When the first electronic device exits the maintenance state, the first electronic device is in a secure environment (the first electronic device exits the maintenance mode, or the first electronic device exits maintenance inspection), and the second electronic device also exits the maintenance mode based on the second data sent by the first electronic device, to ensure that the second electronic device can be normally used.

The following describes in detail the data protection method in Embodiment 2 with reference to a specific application scenario.

Figure 9:
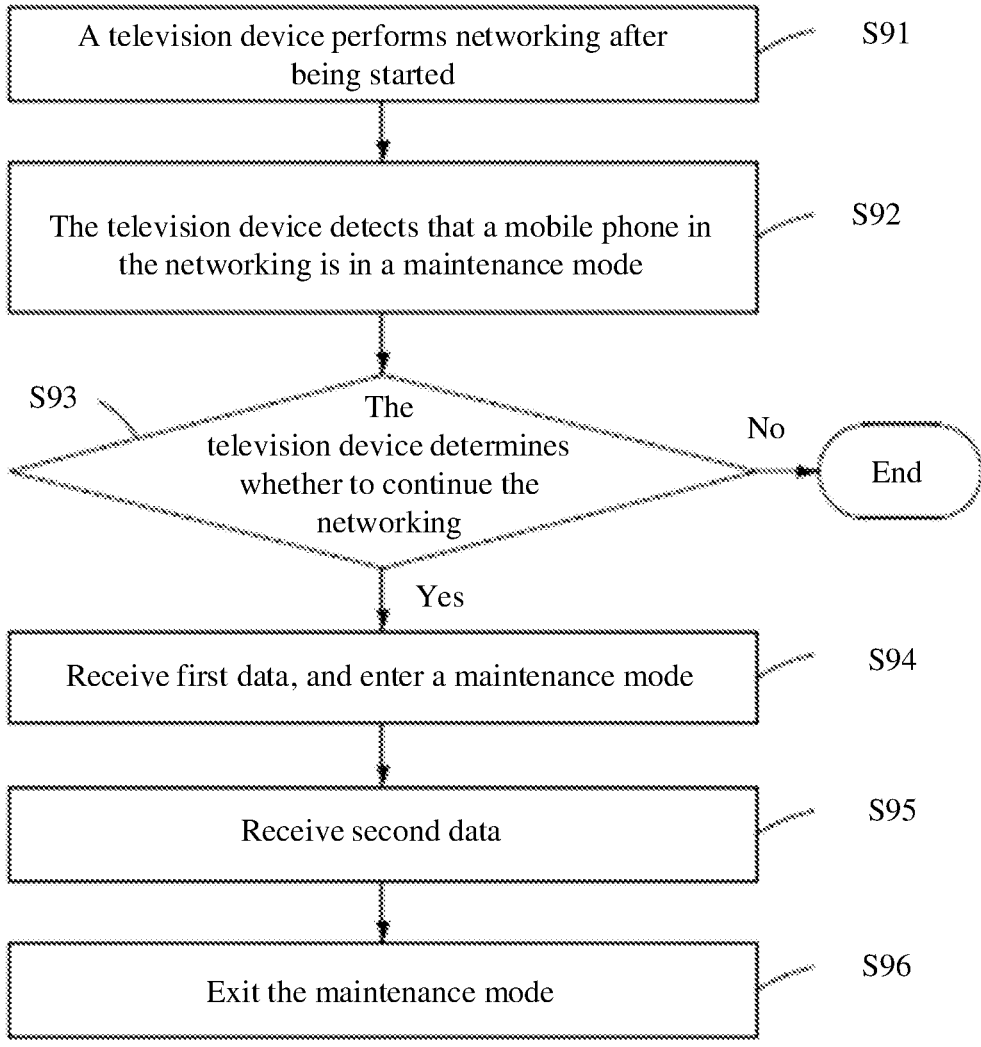
FIG. 9 is a schematic flowchart of another data protection method according to an embodiment of this application.

FIG. 9 is a schematic flowchart of another data protection method according to an embodiment of this application.

Step S91: A television device performs networking after being started.

In this embodiment of this application, the television device breaks a network connection after being powered off. When the television device is started, the television device requests to establish a connection to perform networking.

Step S92: The television device detects that a mobile phone in the networking is in a maintenance mode.

In this embodiment of this application, after sending a connection request to the mobile phone, the television device receives first data sent by the mobile phone and learns that the mobile phone is currently in a maintenance mode.

Step S93: The television device determines whether to continue the networking.

In this embodiment of this application, the television device determines, based on an instruction of a user, whether to continue the networking, and the television device may display a prompt "The mobile phone in the networking is in the maintenance mode. Whether to continue the networking?". When the user taps "No", the television device stops the networking, and the procedure ends.

Step S94: The television device continues the networking, receives the first data, and enters a maintenance mode.

In this embodiment of this application, when the user taps "Yes", the television device continues the networking, and the mobile phone detects the networking of the television device and sends the first data to the television device. The television device continues the networking and receives the first data sent by the mobile phone. The television device enters the maintenance mode based on the first data.

Step S95: The television device receives second data.

In this embodiment of this application, after maintenance of the mobile phone is completed, the mobile phone broadcasts the second data, and the television device receives the second data.

Step S96: The television device exits a maintenance mode.

In this embodiment of this application, in this step, the television device exits the maintenance mode based on the second data sent by the mobile phone.

It may be understood that communication connections of a plurality of devices are not limited to the communication connection between the foregoing two electronic devices. The first electronic device may further transmit the first data and/or the second data in a broadcast manner, and notify that a current state of the first electronic device is a maintenance state, so that another device networked with the first electronic device also enters a maintenance mode.

Embodiment 3

Figure 10:
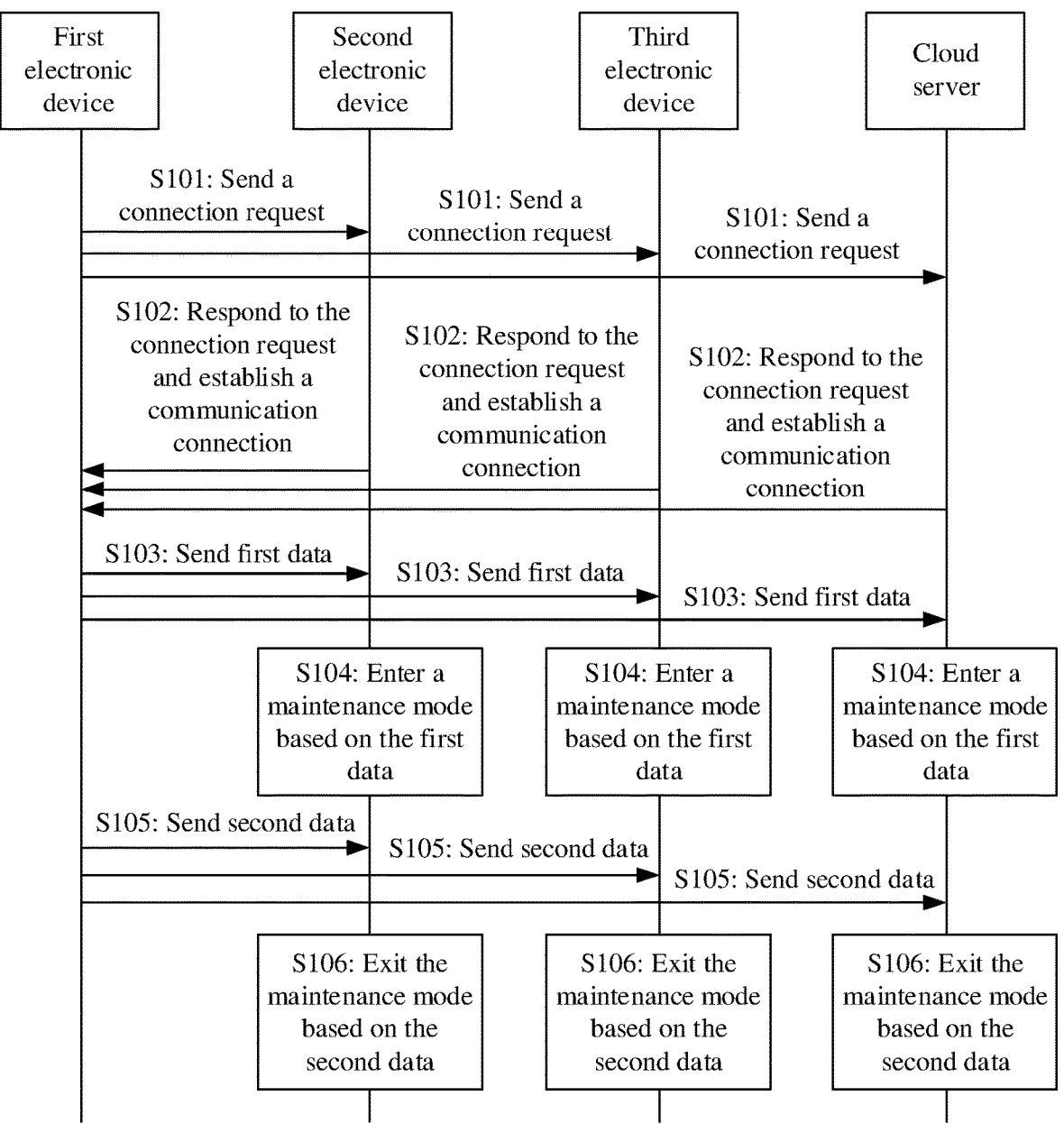
FIG. 10 is a schematic flowchart of another data protection method according to an embodiment of this application.

FIG. 10 is a schematic flowchart of another data protection method according to an embodiment of this application. The method is applied to an electronic device or a cloud server. The method includes the following steps.

Step S101: A first electronic device broadcasts a connection request of the first electronic device to a second electronic device, a third electronic device, and a cloud server.

In this embodiment of this application, a quantity of electronic devices networked with the first electronic device is not specifically limited, and the connection request may include device information and account information of the first electronic device.

Step S102: The second electronic device, the third electronic device, and the cloud server respond to the connection request; and the second electronic device, the third electronic device, and the cloud server each establish a communication connection to the first electronic device.

In this embodiment of this application, the second electronic device, the third electronic device, and the cloud server each verify the account information in the connection request, to determine whether the first electronic device is an electronic device with the same account, thereby determining whether the first electronic device is a trusted device. When the first electronic device is a trusted device of the second electronic device, the first electronic device establishes a communication connection to the second electronic device. The third electronic device and the cloud server each establish a communication connection to the first electronic device in a similar manner. Details are not described herein again.

Step S103: When detecting a first trigger condition, the first electronic device sends first data to the second electronic device, the third electronic device, and the cloud server. The first data is used to trigger each of the second electronic device, the third electronic device, and the cloud server to enter a maintenance mode.

Step S104: The second electronic device, the third electronic device, and the cloud server each enter the maintenance mode based on the first data.

Step S105: When detecting a second trigger condition, the first electronic device sends second data to the second electronic device, the third electronic device, and the cloud server. The second data is used to trigger each of the second electronic device, the third electronic device, and the cloud server to exit the maintenance mode.

Step S106: The second electronic device, the third electronic device, and the cloud server each exit the maintenance mode based on the second data.

The following describes in detail the data protection method in Embodiment 3 with reference to a specific application scenario.

Figure 11:
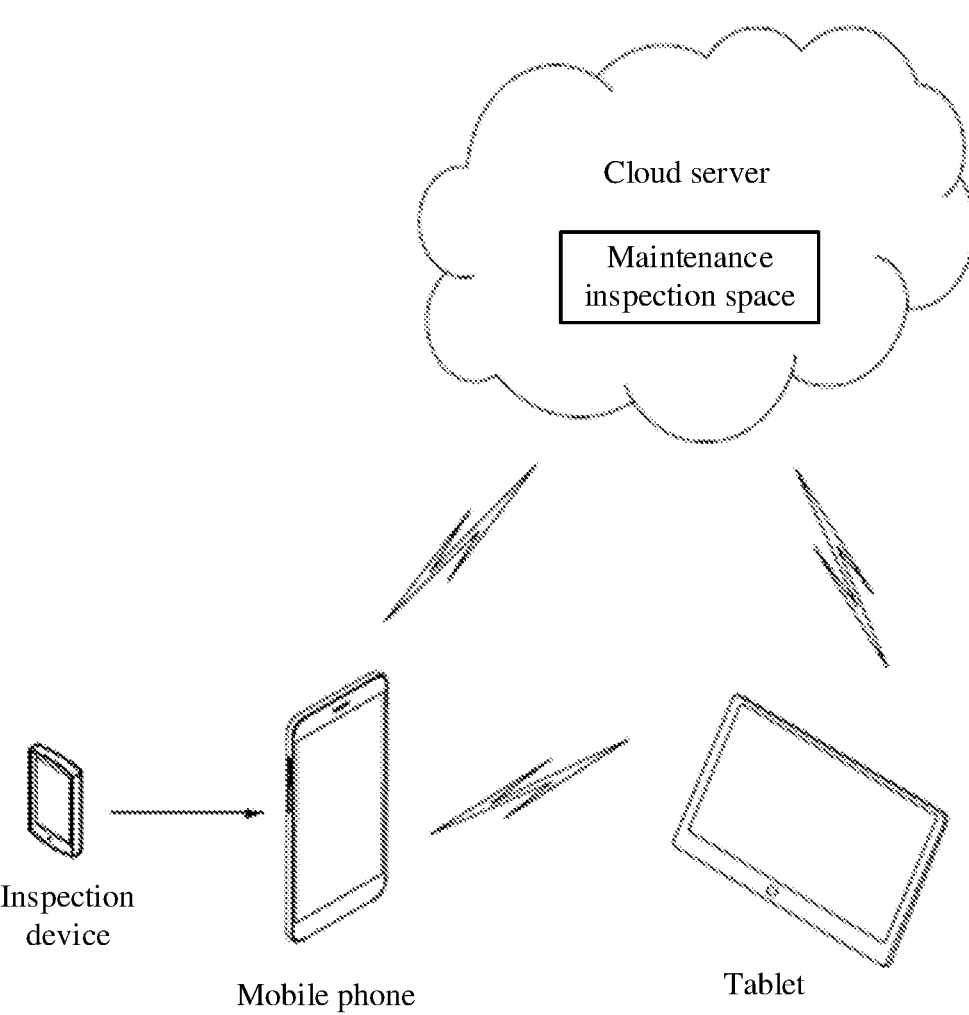
FIG. 11 is a schematic diagram of a data protection scenario according to an embodiment of this application.

With reference to FIG. 11, a mobile phone of a user establishes a communication connection to each of a tablet and a cloud server, and data of the cloud server can be accessed through the mobile phone and the tablet. Based on interconnection and interworking, the mobile phone and the tablet may access data of each other.

If the mobile phone in networking is faulty, the user takes the faulty mobile phone to maintenance personnel for repair. The maintenance personnel can input commands, such as an adb command, to the tablet and the cloud server through an inspection path between the inspection device and the mobile phone, so that the mobile phone can obtain data from a specified directory of the tablet and the cloud server.

With reference to FIG. 11, the user sets the mobile phone to a maintenance mode, and the maintenance personnel may not be able to obtain privacy data in the mobile phone.

The mobile phone broadcasts first data to the tablet and the cloud server that are networked with the mobile phone, to notify the tablet and the cloud server in the networking that the mobile phone is currently in the maintenance mode. After the tablet and the cloud server receive the broadcast information of the mobile phone, the tablet and the cloud server each automatically enter a maintenance mode. The cloud server applies for new space as maintenance inspection space, so that the mobile phone and the tablet can access the maintenance inspection space. The tablet may also apply for new space as maintenance inspection space, so that the mobile phone accesses the maintenance inspection space. The maintenance personnel cannot obtain, through the mobile phone, privacy data of the tablet and the cloud server that are networked with the mobile phone. After the mobile phone is repaired, the user obtains the repaired mobile phone, and the mobile phone exits the maintenance mode. In this case, the mobile phone broadcasts second data of the mobile phone to the tablet and the cloud server, to notify the tablet and the cloud server in the networking that the mobile phone currently exits the maintenance mode. The tablet and the cloud server each exit the maintenance mode based on the second data. A device in the networking of the mobile phone can normally communicatively access data. The tablet and the cloud server may release the applied maintenance inspection space. The tablet may further display a prompt, to prompt the user whether to save data in the maintenance inspection space.

In this embodiment of this application, when an electronic device in the networking is in a maintenance mode, or the electronic device enters a maintenance mode, or the electronic device is currently in a maintenance state, another electronic device and the cloud server in the networking each automatically enter the maintenance mode, thereby implementing data protection for the electronic device in the networking.

When implementing this embodiment of this application, the inventor finds that collaborative inspection and multi-device joint problem diagnosis need to be performed between a plurality of devices in some scenarios. In this case, data leakage may occur. For example, if there is a problem in projection functions of the mobile phone and a smart screen, the projection functions of the mobile phone and the smart screen need to be both inspected to determine the problem. In this case, the mobile phone needs to be communicatively connected to the smart screen, and the projection functions of the mobile phone and the smart screen are both inspected. Based on interconnection and interworking between the mobile phone and the smart screen, the mobile phone and the smart screen can access data of each other and remotely communicate with each other. When the user takes the mobile phone to the maintenance personnel for maintenance, the maintenance personnel remotely inspect the smart screen through the mobile phone. Even if the mobile phone enters a maintenance mode, the smart screen is not in a data protection state.

Therefore, this application provides another data protection method, to protect privacy data of an electronic device in networking during multi-device joint problem diagnosis, so that another person cannot access or obtain privacy data of the user in an electronic device in the networking.

Embodiment 4

Figure 12:
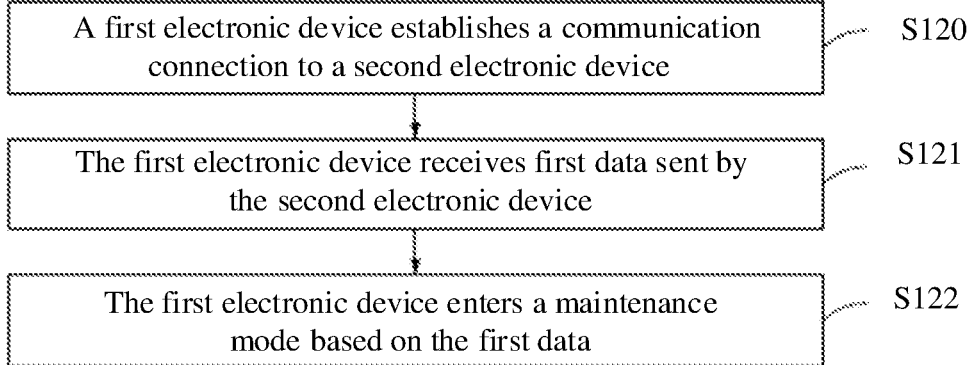
FIG. 12 is a schematic flowchart of another data protection method according to an embodiment of this application.

FIG. 12 is a schematic flowchart of another data protection method according to an embodiment of this application. The method is applied to an electronic device or a cloud server. The method includes the following steps.

Step S120: A first electronic device establishes a communication connection to a second electronic device. The second electronic device is a trusted device of the first electronic device.

Step S121: The first electronic device receives first data sent by the second electronic device. The first data is used to trigger the first electronic device to enter a maintenance mode.

In this embodiment of this application, the second electronic device detects a first trigger condition, and the second electronic device sends the first data to the first electronic device. The first trigger condition includes any one of the following: that the second electronic device is in a maintenance inspection state, or the second electronic device is in a maintenance mode, or the second electronic device enters a maintenance mode. The first trigger condition further includes: the second electronic device requests the first electronic device to provide inspection permission. In other words, when the second electronic device is in the maintenance inspection state, and the second electronic device requests the first electronic device to provide the inspection permission, the second electronic device sends the first data. Alternatively, when the second electronic device is in the maintenance mode, and the second electronic device requests the first electronic device to provide the inspection permission, the second electronic device sends the first data. Alternatively, when the second electronic device enters the maintenance mode, and the second electronic device requests the first electronic device to provide the inspection permission, the second electronic device sends the first data.

In this embodiment of this application, the second electronic device requests the first electronic device to provide the inspection permission, so that an inspection device can perform maintenance inspection on the first electronic device, or the inspection device performs maintenance inspection on the first electronic device through the second electronic device.

Step S122: The first electronic device enters the maintenance mode based on the first data.

In a possible implementation, the second electronic device sends a first data packet to the first electronic device, so that the first electronic device can receive the first data.

For example, a schematic structure of a part of the first data packet is provided as follows:

```
{
    Interaction type: inspection request (diagRequest)
    Current mode: maintenance mode (uid127)
}
```

Correspondingly, the first electronic device parses the first data packet, and returns the following information to the second electronic device:

```
{
    Interaction type: inspection request (diagRequest)
        Current mode: maintenance mode (uid127)
        Access status: ready (ready)
}
```

When the first electronic device learns, through parsing, that a command format is the maintenance mode and the interaction type is the inspection request, that is, the first electronic device is requested to provide the inspection permission, the first electronic device switches to the maintenance mode, and returns a command to the second electronic device, to notify the second electronic device that the first electronic device is ready to enter the maintenance mode.

A same part among Embodiment 2, Embodiment 3, and Embodiment 4 is that when another electronic device in networking is in a maintenance inspection state or in a maintenance mode or enters a maintenance mode, first data sent by the another electronic device in the networking is received, to switch to the maintenance mode based on the first data. A difference between Embodiment 4 and each of Embodiment 2 and Embodiment 3 is that, in addition to information about a status of the second electronic device in the networking, the first data further includes information for requesting the first electronic device to provide the inspection permission. To be specific, when the second electronic device in the networking is in the maintenance inspection state or in the maintenance mode or enters the maintenance mode, the first electronic device receives the first data of the second electronic device; learns, based on the first data, that the second electronic device is in the maintenance inspection state or in the maintenance mode or enters the maintenance mode, and that the second electronic device requests the first electronic device to provide the inspection permission; and enters the maintenance mode.

The following describes in detail the data protection method in Embodiment 4 with reference to a specific application scenario.

Figure 13:
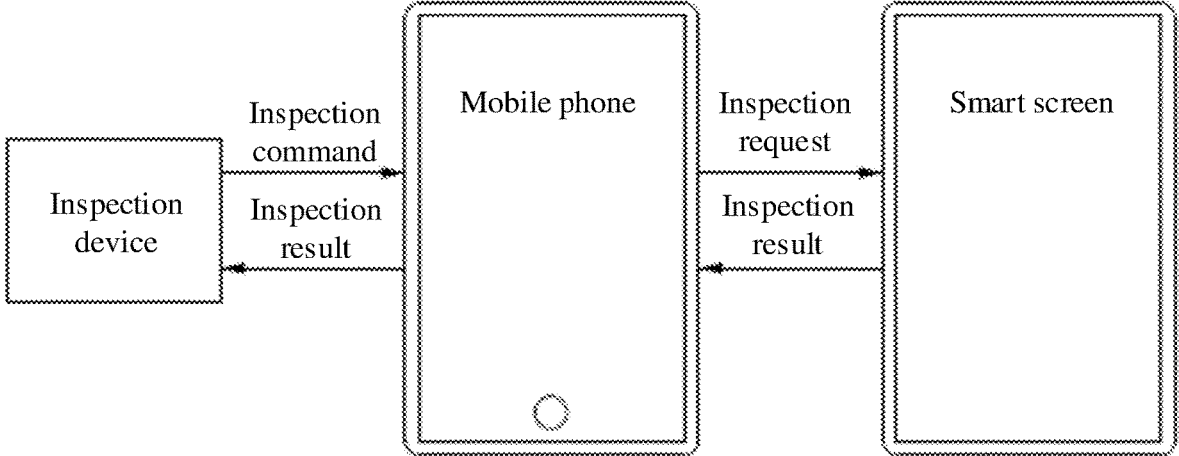
FIG. 13 is a schematic diagram of another data protection scenario according to an embodiment of this application.

With reference to FIG. 13, a mobile phone and a smart screen are networked. A user takes a faulty mobile phone to maintenance personnel for repair. The mobile phone enters a maintenance mode. The smart screen receives broadcast information sent by the mobile phone, and learns that the mobile phone is in the maintenance mode, but the smart screen has not entered a maintenance mode. The mobile phone receives an inspection command sent by an inspection device. The mobile phone determines, based on the inspection command, whether the smart screen in the networking is to be inspected. If the smart screen in the networking does not need to be inspected, the mobile phone responds to the inspection command of the inspection device, and sends an inspection result to the inspection device. The inspection device obtains the inspection result of the mobile phone. When the smart screen in the networking needs to be inspected, the mobile phone sends first data to the smart screen. The first data includes: the mobile phone is in the maintenance mode and requests the smart screen to provide inspection permission. The smart screen learns, based on the first data, that the mobile phone is in the maintenance mode and the mobile phone requests the smart screen to provide the inspection permission. In this case, the smart screen enters the maintenance mode. The smart screen detects a currently running application, applies for memory space, that is, memory space in the maintenance mode, and caches data such as a list of the current application to the memory space in the maintenance mode. For example, if iQIYI is playing a program, the smart screen copies information such as a database and a playlist of iQIYI to the memory space in the maintenance mode and encrypts privacy data. The smart screen can further display a prompt to notify the user that the smart screen is about to enter the maintenance mode. The inspection device remotely inspects the smart screen through the mobile phone. Content cached by the smart screen can continue the displaying. After the inspection is completed, the smart screen sends an inspection result to the mobile phone. The mobile phone collects the inspection result of the smart screen, and sends the inspection results of both the mobile phone and the smart screen to the inspection device. When the repair ends, the smart screen prompts the user that the access is completed, and the smart screen automatically exits the maintenance mode.

The first data that is received by the electronic device and that instructs the electronic device to enter the maintenance mode may come from a direct setting of the user for the electronic device, or may come from data sent by the another electronic device. The data sent by the another electronic device may include the first data that is automatically sent by the another electronic device when the first trigger condition is met, or may include the first data sent by the user to the another electronic device through the electronic device.

In one of the scenarios, after the user takes the mobile phone for repair, the user finds that the mobile phone is not set to the maintenance mode. In this case, it is inconvenient to go back to set the mobile phone to the maintenance mode. Therefore, this application provides another data protection method in which dynamic authorization is performed on a plurality of devices in networking, so that an electronic device enters a maintenance mode according to an instruction of a user.

Embodiment 5

Figure 14:
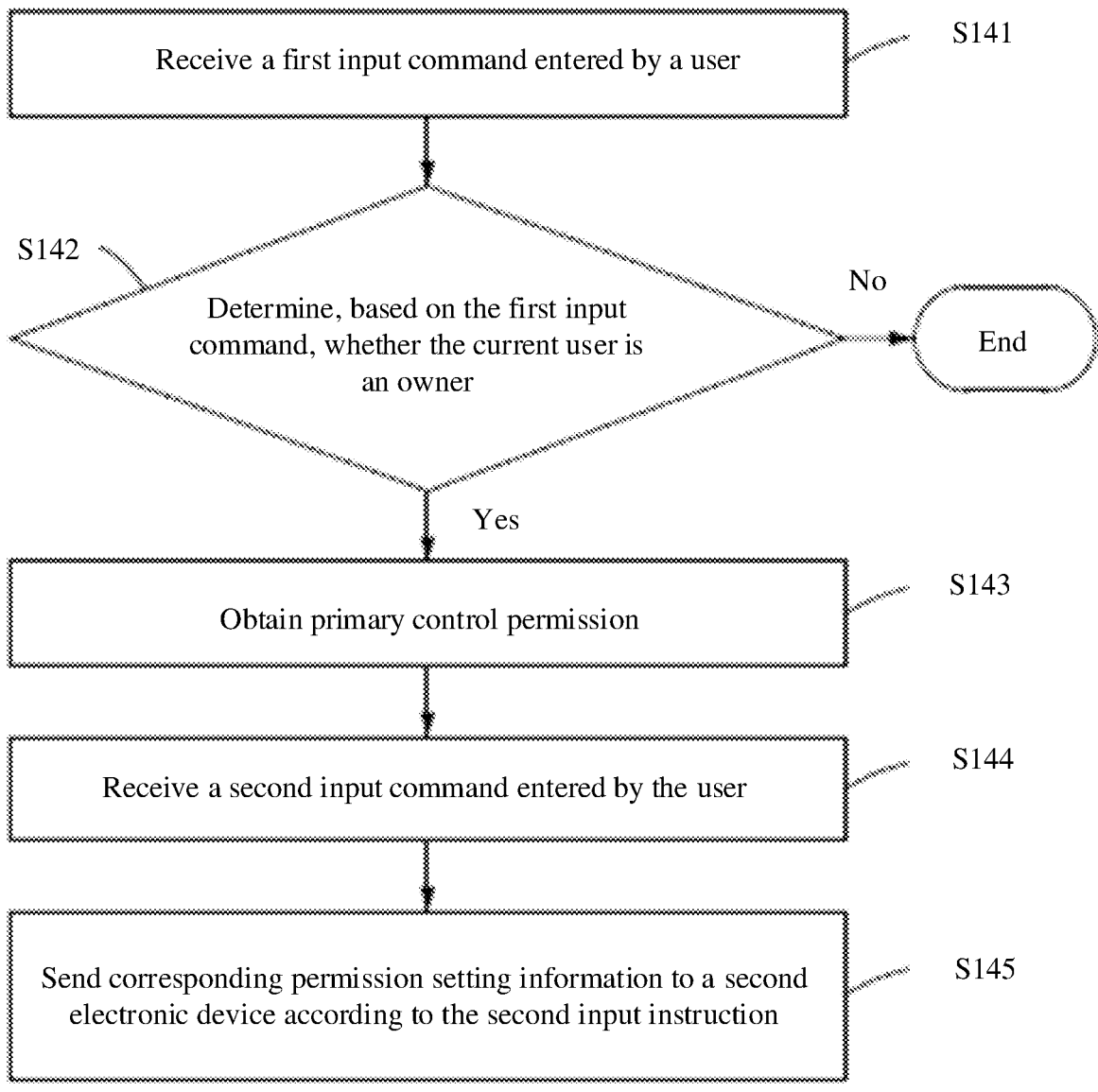
FIG. 14 is a schematic flowchart of another data protection method according to an embodiment of this application.

FIG. 14 is a schematic flowchart of another data protection method according to an embodiment of this application. The method is applied to a first electronic device. The method includes the following steps.

Step S141: Receive a first input command entered by a user.

In this embodiment of this application, the first input command may include a password, fingerprint information, a gesture password, facial information, and the like. The first input command is used to verify whether the user is an owner of the first electronic device.

Step S142: Determine, based on the first input command, whether the current user is the owner.

In this embodiment of this application, when the password meets a prestored password, it is determined that the current user is the owner. When the fingerprint information meets prestored fingerprint information, it is determined that the current user is the owner. When the gesture password meets a prestored gesture password, it is determined that the current user is the owner. When the facial information meets prestored facial information, it is determined that the current user is the owner.

Step S143: If the current user is the owner, obtain primary control permission. The primary control permission is used to set permission of another electronic device in networking.

In this embodiment of this application, when the current user is the owner, a first electronic device obtains the primary control permission, and the first electronic device is a primary control device. In other words, the user may set the permission of the another electronic device in the networking by using the primary control device.

Step S144: Receive a second input instruction entered by the user.

In this embodiment of this application, the second input command is used to indicate an electronic device that needs to be set and permission corresponding to the electronic device, and includes an ID of the electronic device that needs to be set, the permission corresponding to the electronic device, and the like.

Step S145: Send corresponding permission setting information to a second electronic device according to the second input instruction, so that the second electronic device sets permission of the second electronic device based on the permission setting information.

In this embodiment of this application, the first electronic device and the second electronic device are devices using a same account for login, the second electronic device is a trusted device of the first electronic device, and the first electronic device establishes a communication connection to the second electronic device. The first electronic device and the second electronic device may be not devices with a same account, and the second electronic device may be a trusted device authorized and verified by the user.

In this embodiment of this application, the user inputs a second input command through the first electronic device. The second input command instructs to set permission of the second electronic device to a maintenance mode. To be specific, the first electronic device receives an instruction that is entered by the user and that instructs the second electronic device to enter the maintenance mode, and the first electronic device sends data to the second electronic device to trigger the second electronic device to enter the maintenance mode.

The following describes in detail the data protection method in Embodiment 5 with reference to a specific application scenario.

A user takes a mobile phone for repair, but forgets to set the mobile phone to enter a maintenance mode. A device that can be currently used by the user is a tablet. The user inputs a first input command on the tablet. The tablet verifies that the current user is an owner. In this case, the tablet obtains primary control permission, and can set permission of another electronic device in networking according to a second input command entered by the user. The user inputs the second input command to the tablet to set permission of the mobile phone with a same login account to a maintenance mode. In this case, the second input command is a maintenance setting instruction. The tablet receives the maintenance setting instruction entered by the user. The maintenance setting instruction instructs the mobile phone to enter the maintenance mode. The tablet sends first data to the mobile phone according to the maintenance setting instruction, so that the mobile phone enters the maintenance mode based on the first data.

Figure 15:
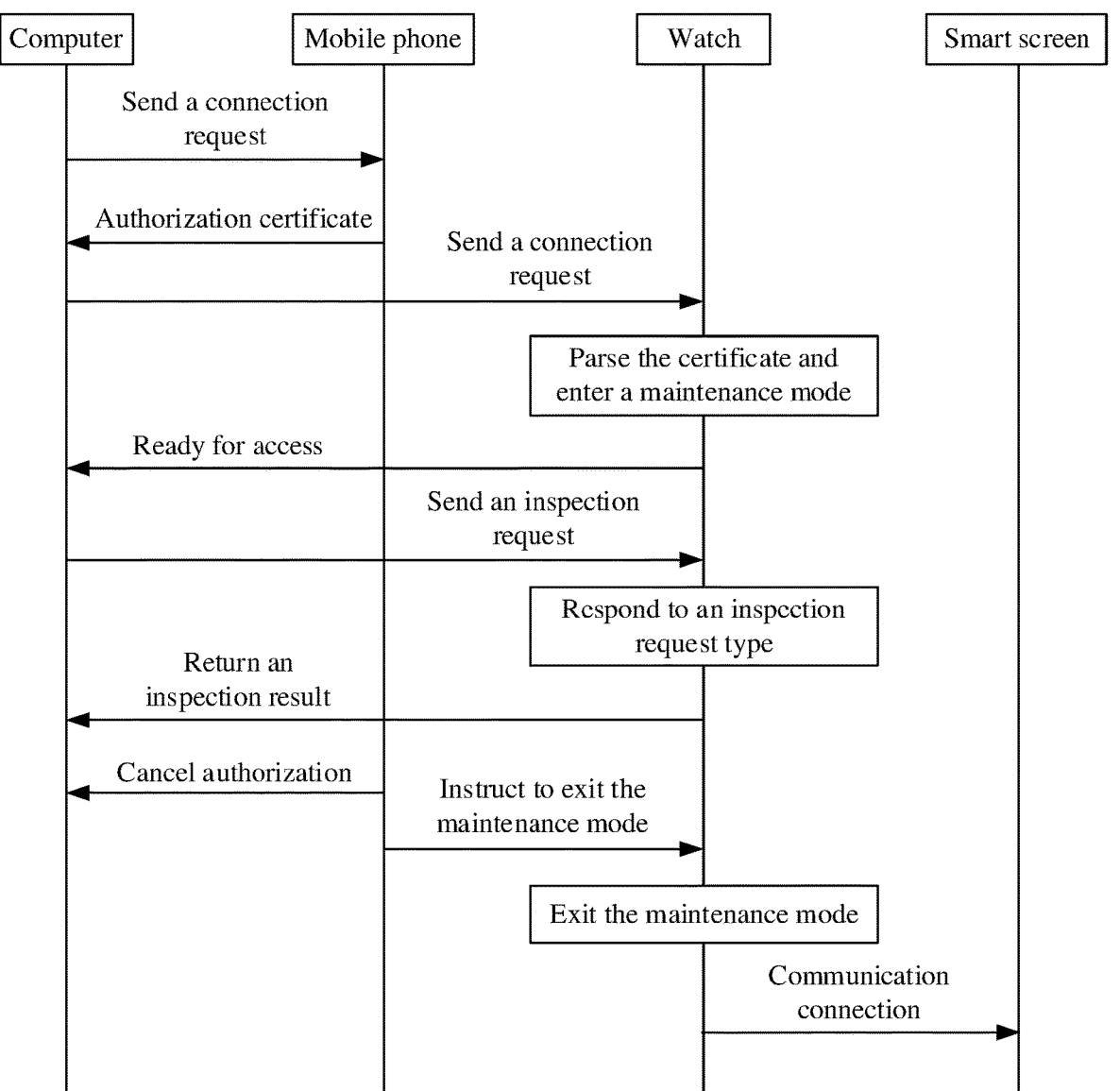
FIG. 15 is a schematic diagram of another data protection scenario according to an embodiment of this application.
Figure 16:
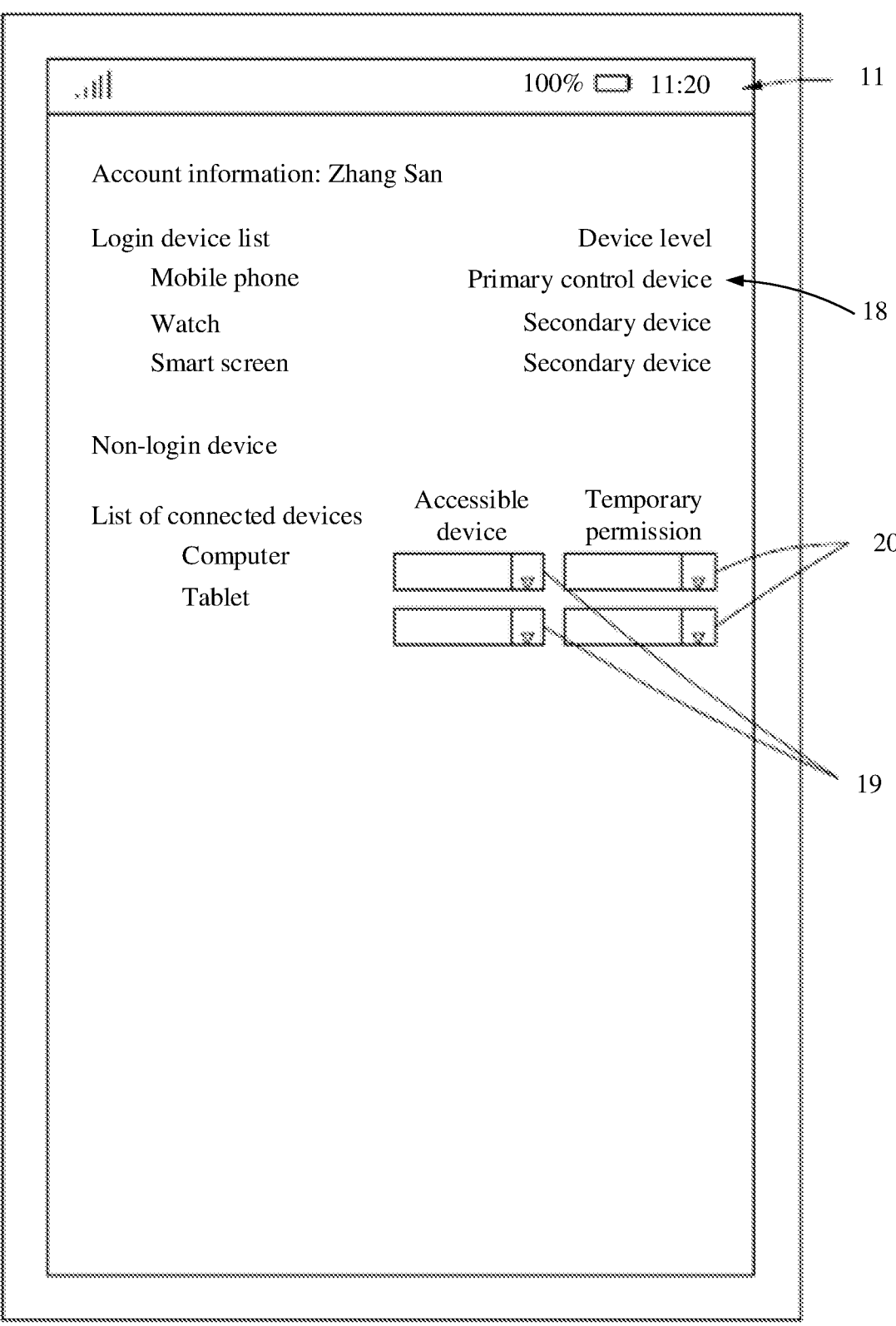
FIG. 16 is a schematic diagram of a permission setting interface according to an embodiment of this application.

In this embodiment of this application, the primary control device may further set permission for a device with a different login account in the networking. With reference to FIG. 15, a mobile phone, a watch, and a smart screen are devices with a same login account, and the mobile phone, the watch, and the smart screen are trusted devices of each other. Maintenance personnel use a computer with a different login account to inspect the watch. The computer sends a connection request to the mobile phone. A prompt indicating whether to access the computer is displayed on an interface of the mobile phone. After the user determines to access the computer, a permission setting interface 18 shown in FIG. 16 is displayed. The permission setting interface 18 includes a status bar 11, account information, a list of devices logging in an account, a device level, a non-login device, a list of connected devices, an accessible device including a corresponding accessible device selection box 19, and temporary permission including a corresponding temporary permission selection box 20.

The status bar 11 may include time, signal strength, a current battery level, and the like. The account information is a login account name of the user, for example, Zhang San. The login device list displays devices that log in the same account, and device levels of the devices. For example, the devices that log in the same account include the mobile phone, the watch, and the smart screen. The device level of the mobile phone is a primary control device, and the device levels of the watch and the smart screen are secondary devices. The list of connected devices in non-login devices includes the computer and a tablet. There are selection boxes for accessible devices corresponding to the computer and the tablet. The user may operate the selection boxes to determine the accessible devices of the computer and the tablet. There are selection boxes for temporary permission corresponding to the computer and the tablet. The user may operate the selection boxes to determine the temporary permission of the computer and the tablet.

Figure 17:
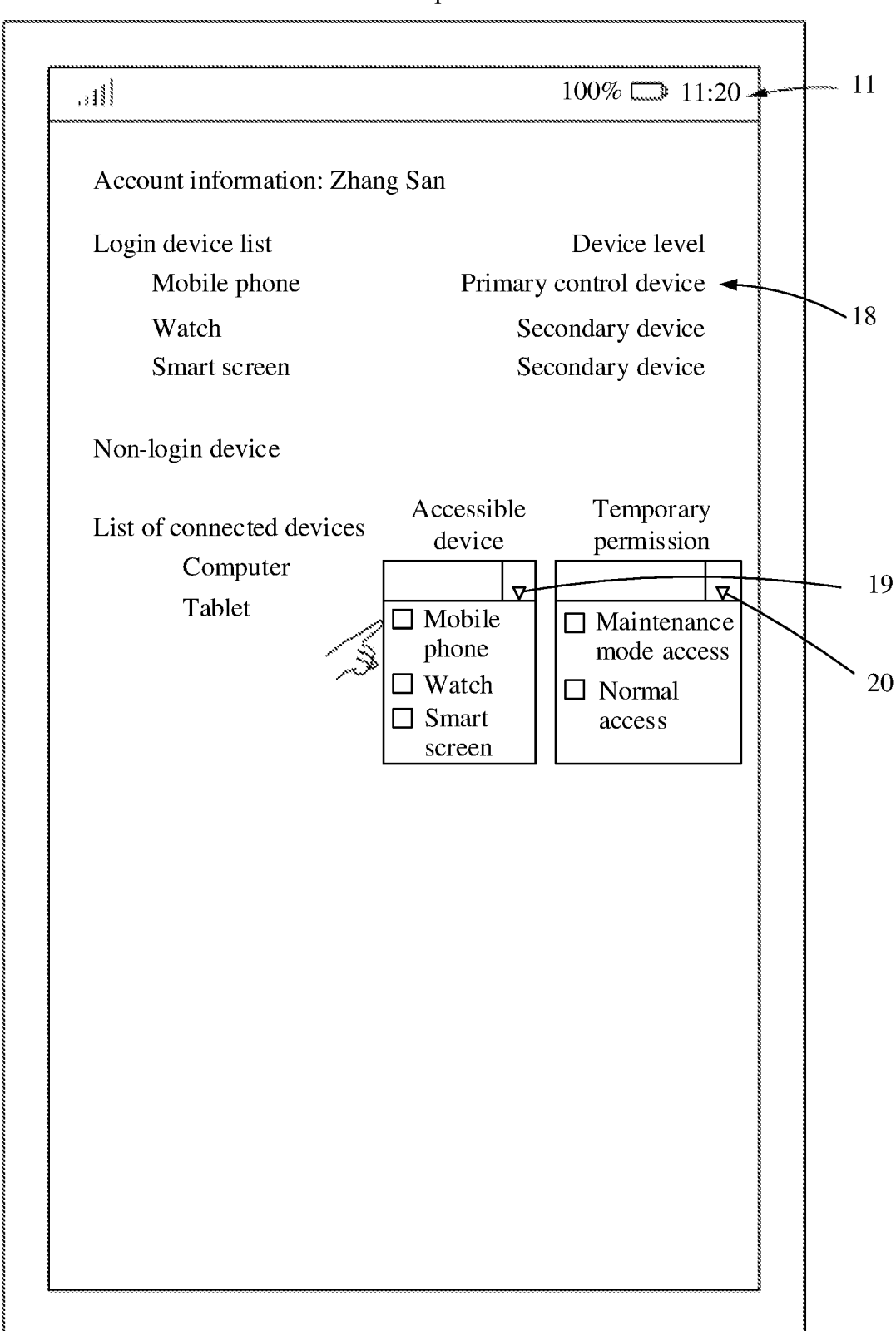
FIG. 17 is a schematic diagram of another permission setting interface according to an embodiment of this application.
Figure 18:
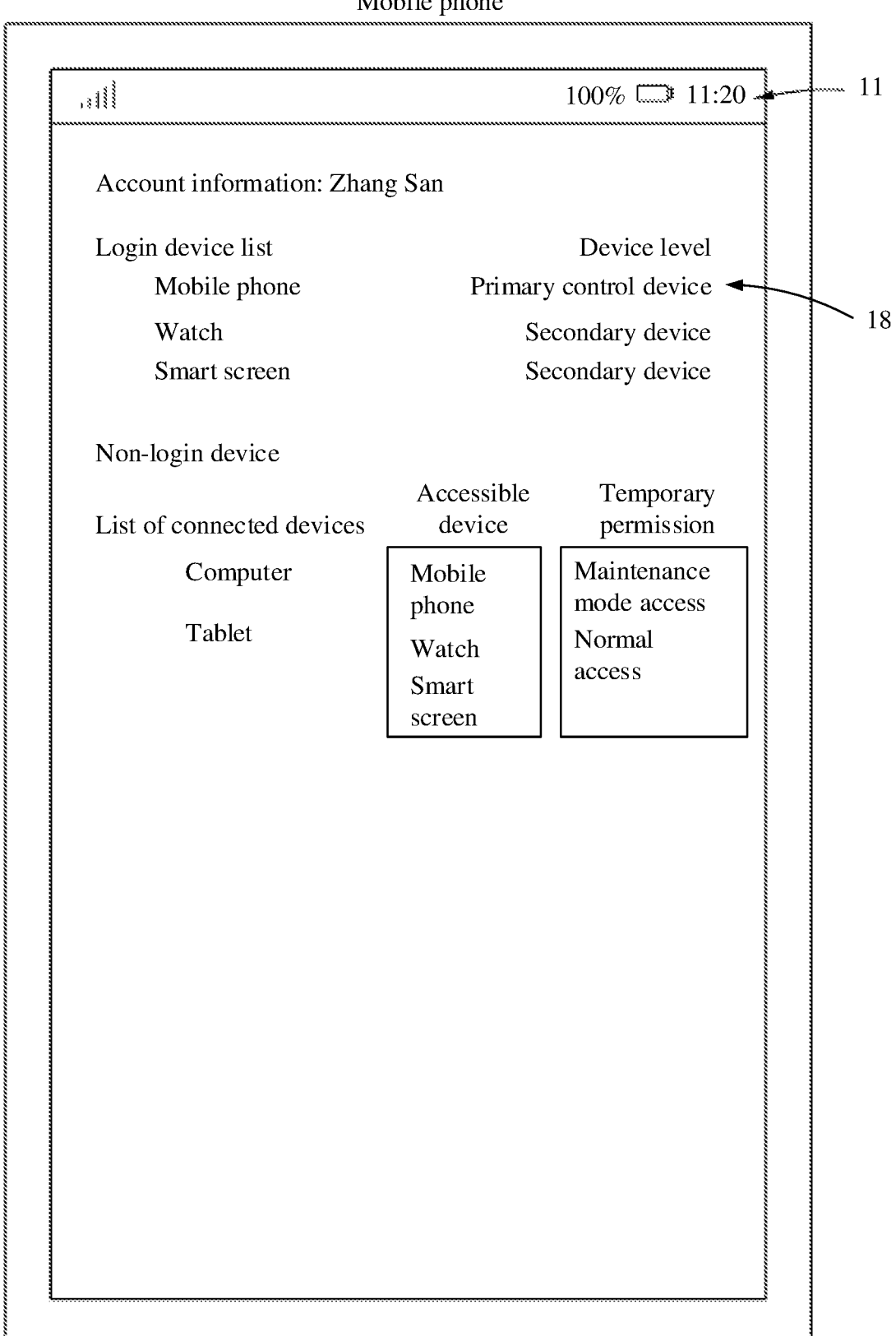
FIG. 18 is a schematic diagram of another permission setting interface according to an embodiment of this application.

As shown in FIG. 17, the user taps the accessible device selection box 19 corresponding to the computer on the permission setting interface 18, and a window indicating that the accessible devices of the computer include the mobile phone, the watch, and the smartphone is displayed. The user taps the temporary permission selection box 20, and a window indicating that the corresponding temporary permission includes maintenance mode access and normal access is displayed. A device that can be accessed by the computer and that is selected by the user includes the watch. Temporary permission that corresponds to the computer and that is selected by the user includes the maintenance mode access. A device that can be accessed by the tablet and that is selected by the user includes the smart screen. Temporary permission that corresponds to the tablet and that is selected by the user includes the normal access. After the permission of the computer is set, refer to FIG. 18. If the computer obtains an authorization certificate sent by the mobile phone, the computer can access the watch in the maintenance mode. To be specific, when the computer establishes a communication connection to the watch, the computer sends a connection request to the watch. The connection request includes the authorization certificate. The watch parses the authorization certificate to obtain the maintenance mode access permission of the computer in the connection request. The watch enters the maintenance mode based on the maintenance mode access permission of the computer. The watch responds to the connection request, and sends data to the computer to notify the computer that the watch is ready for access. The watch establishes the communication connection to the computer. By analogy, when the computer is authorized to access more electronic devices, the computer can access another electronic devices only after being authorized by the primary control device: the mobile phone. In this way, the following case is avoided: Mutual authentication needs to be performed for each electronic device in the same network. The computer sends first data to the watch. After receiving the first data, the watch responds to an inspection request type. The watch provides inspection permission, and sends an inspection result to the computer after the inspection is completed.

After the computer completes the inspection, the user cancels the authorization of the computer on the mobile phone. The mobile phone instructs the watch to exit the maintenance mode, and the watch exits the maintenance mode.

An access setting and an access manner of the tablet are similar to those of the computer. Details are not described herein again. If the accessible device of the tablet is the smart screen and the temporary permission of the tablet is the normal access, the tablet can be communicatively connected to the smart screen, and data can be shared between the tablet and the smart screen.

In this embodiment of this application, after receiving a command entered by the user, the first electronic device may send the first data to another electronic device networked with the first electronic device. The first data instructs the another electronic device networked with the first electronic device to enter the maintenance mode, so that the another electronic device networked with the first electronic device can enter the maintenance mode under control of the user.

It is clear that, for a person skilled in the art, this application is not limited to details of the foregoing example embodiments, and this application can be implemented in another specific form without departing from the spirit or basic features of this application. Therefore, appropriate modifications and variations made to the foregoing embodiments shall fall within the protection scope of this application provided that the modifications and variations fall within the essence and spirit of this application.

What is claimed is:

1. A data protection method for protecting private data on a second electronic device when connected with a first electronic device, the method comprising:

receiving, by the second electronic device, a connection request sent by the first electronic device;

verifying, by the second electronic device, a first electronic device account of the first electronic device is the same as a second electronic device account of the second electronic device by verifying account information provided by the first electronic device, the first electronic device comprising a trusted device of the second electronic device when the first electronic device account is the same as the second electronic device account;

establishing, by the second electronic device, a communication connection with the first electronic device based on the account being verified;

receiving, by the second electronic device, first data from the first electronic device, the first data triggering the second electronic device to enter into a maintenance mode, the maintenance mode including one or more of:

storing a privacy data in a preset storage space;

disabling access to the preset storage space;

initializing an interface of the first electronic device to factory settings;

blocking access to downloaded applications; or blocking access to recorded data of embedded applications; and receiving, by the second electronic device, second data from the first electronic device, the second data causing the second electronic device to exit the maintenance mode.

2. The method according to claim 1, wherein the first trigger condition comprises:

the first electronic device is in a maintenance inspection state, the first electronic device is in the maintenance mode, or the first electronic device enters the maintenance mode.

3. The method according to claim 2, wherein the first trigger condition further comprises:

the first electronic device requests the second electronic device to provide an inspection permission.

4. The method according to claim 1, wherein the first trigger condition comprises:

the first electronic device receives an instruction that is entered by a user and that instructs the second electronic device to enter the maintenance mode.

5. The method according to claim 2, the maintenance mode further causing the second electronic device to encrypt the privacy data of the second electronic device to prevent the privacy data from being viewed, exported, or transferred, wherein the privacy data comprises one or more of: personal information of the user, sensitive data of the user, data recorded when the user performs an operation on a new electronic device, an application downloaded by the user, data generated when the user uses an application, or data received by the user through an application.

6. The method according to claim 2, wherein that the first electronic device enters the maintenance mode comprises:

providing an inspection permission to implement a maintenance inspection on the first electronic device.

7. The method according to claim 2, wherein that the first electronic device enters the maintenance mode comprises:

providing a maintenance inspection space; and opening an access permission of the maintenance inspection space to a trusted device of the first electronic device.

8. A data protection system, comprising:

a first electronic device; and at least a second electronic device;

the first electronic device being configured to:

send a connection request to the second electronic device;

the second electronic device being configured to:

verify a first electronic device account of the first electronic device is the same as a second electronic device account of the second electronic device, the first electronic device comprising a trusted device of the second electronic device when the first electronic device account is the same as the second electronic device account;

establish a communication connection with the first electronic device based on the account being verified;

the first electronic device being configured to:

send first data to the second electronic device when a first trigger condition has been detected by the first electronic device;

the second electronic device being configured to:

receive the first data from the first electronic device, the first data triggering the second electronic device to enter into a maintenance mode, the maintenance mode including one or more of:

storing a privacy data in a preset storage space;

disabling access to the preset storage space;

initializing an interface of the first electronic device to factory settings;

blocking access to downloaded applications; or blocking access to recorded data of embedded applications; and receive second data from the first electronic device, the second data causing the second electronic device to exit the maintenance mode.

9. The data protection system according to claim 8, wherein the first trigger condition comprises:

the first electronic device is in a maintenance inspection state, the first electronic device is in the maintenance mode, or the first electronic device enters the maintenance mode.

10. The data protection system according to claim 9, wherein the first trigger condition further comprises:

the first electronic device requests the second electronic device to provide an inspection permission.

11. The data protection system according to claim 8, wherein the first trigger condition comprises:

the first electronic device receives an instruction that is entered by a user and that instructs the second electronic device to enter the maintenance mode.

12. The data protection system according to claim 9, the maintenance mode further causing the second electronic device to encrypt the privacy data of the second electronic device to prevent the privacy data from being viewed, exported, or transferred, wherein the privacy data comprises one or more of: personal information of the user, sensitive data of the user, data recorded when the user performs an operation on a new electronic device, an application downloaded by the user, data generated when the user uses an application, or data received by the user through an application.

13. The data protection system according to claim 9, wherein that the first electronic device enters the maintenance mode comprises:

providing an inspection permission to implement a maintenance inspection on the first electronic device.

14. The data protection system according to claim 9, wherein that the first electronic device enters the maintenance mode comprises:

providing a maintenance inspection space; and opening an access permission of the maintenance inspection space to a trusted device of the first electronic device.

15. A second electronic device, the second electronic device configured to protect private data on the second electronic device when connected with a first electronic device, the second electronic device comprising:

a memory storing instructions; and at least one processor in communication with the memory, the at least one processor configured, upon execution of the instructions, to perform the following steps:

receiving a connection request sent by the first electronic device;

verifying a first electronic device account of the first electronic device is the same as a second electronic device account of the second electronic device, the first electronic device comprising a trusted device of the second electronic device when the first electronic device account is the same as the second electronic device account;

establishing a communication connection with the first electronic device based on the account being verified;

receiving first data from the first electronic device, the first data triggering the second electronic device to enter a maintenance mode, the maintenance mode including one or more of:

storing a privacy data in a preset storage space;

disabling access to the preset storage space;

initializing an interface of the first electronic device to factory settings;

blocking access to downloaded applications; or blocking access to recorded data of embedded applications; and receiving second data from the first electronic device, the second data causing the second electronic device to exit the maintenance mode.

16. The second electronic device according to claim 15, wherein the first trigger condition comprises:

the first electronic device is in a maintenance inspection state, the first electronic device is in the maintenance mode, or the first electronic device enters the maintenance mode.

17. The second electronic device according to claim 16, wherein the first trigger condition further comprises:

the first electronic device requests the second electronic device to provide an inspection permission.

18. The second electronic device according to claim 15, wherein the first trigger condition comprises:

the first electronic device receives an instruction that is entered by a user and that instructs the second electronic device to enter the maintenance mode.

19. The second electronic device according to claim 16, the maintenance mode further causing the second electronic device to encrypt the privacy data of the second electronic device to prevent the privacy data from being viewed, exported, or transferred, wherein the privacy data comprises one or more of: personal information of the user, sensitive data of the user, data recorded when the user performs an operation on a new electronic device, an application downloaded by the user, data generated when the user uses an application, or data received by the user through an application.

20. The second electronic device according to claim 16, wherein that the first electronic device enters the maintenance mode comprises:

providing the inspection permission to implement a maintenance inspection on the first electronic device; or wherein that the first electronic device enters the maintenance mode comprises:

providing a maintenance inspection space; and opening an access permission of the maintenance inspection space to a trusted device of the first electronic device.

* * * * *